US011955721B2

(12) United States Patent
Yang et al.

(10) Patent No.: US 11,955,721 B2
(45) Date of Patent: Apr. 9, 2024

(54) ANTENNA APPARATUS, COMMUNICATION APPARATUS AND STEERING ADJUSTMENT METHOD THEREOF

(71) Applicant: Gemtek Technology Co., Ltd., Hsinchu (TW)

(72) Inventors: Chung-Kai Yang, Hsinchu (TW); Sin-Liang Chen, Hsinchu (TW); Hsu-Sheng Wu, Hsinchu (TW); Hsiao-Ching Chien, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 545 days.

(21) Appl. No.: 16/686,221

(22) Filed: Nov. 18, 2019

(65) Prior Publication Data

US 2020/0266537 A1 Aug. 20, 2020

Related U.S. Application Data

(60) Provisional application No. 62/807,712, filed on Feb. 19, 2019.

(30) Foreign Application Priority Data

Aug. 21, 2019 (TW) ................................ 108129736

(51) Int. Cl.
*H01Q 3/34* (2006.01)
*H01Q 21/24* (2006.01)

(52) U.S. Cl.
CPC ............... *H01Q 3/34* (2013.01); *H01Q 21/24* (2013.01)

(58) Field of Classification Search
CPC ........ H01Q 3/34; H01Q 21/24; H01Q 1/2266; H01Q 1/2291; H01Q 1/241; H01Q 9/0414;

(Continued)

(56) References Cited

U.S. PATENT DOCUMENTS 4,947,178 A 8/1990 Shafai
5,959,578 A * 9/1999 Kreutel, Jr. .............. H01Q 3/26
342/368

(Continued)

FOREIGN PATENT DOCUMENTS

CN 205595456 9/2016
CN 106816694 6/2017

(Continued)

OTHER PUBLICATIONS

Office Action of China Counterpart Application, dated Aug. 13, 2021, pp. 1-11.

(Continued)

*Primary Examiner* — Olumide Ajibade Akonai
(74) *Attorney, Agent, or Firm* — JCIPRNET

(57) ABSTRACT

An antenna apparatus, a communication apparatus, and a steering adjustment method thereof are provided. The antenna apparatus includes an antenna structure. The antenna structure includes an antenna unit. The antenna unit includes i feeding ports, where i is a positive integer larger than 2. A vector of each of the feeding ports is controlled independently. In the steering adjustment method, a designated direction is determined, where the designated direction corresponds to beam directionality of the antenna structure. In addition, the vectors of the feeding ports of the antenna unit are configured according to the designated direction. Accordingly, the antenna size can be reduced, and beam steering in multiple directions would be achieved.

8 Claims, 21 Drawing Sheets

(58) Field of Classification Search
CPC .... H01Q 21/065; H01Q 21/0006; H01Q 1/36; H01Q 1/24; H01Q 1/48; H01Q 1/50; H01Q 13/10; H01Q 1/243; H01Q 3/40; H04B 7/10; H04B 7/0617; H04B 1/0483
See application file for complete search history.

(56) References Cited

U.S. PATENT DOCUMENTS

| | | | | |
|---|---|---|---|---|
| 6,650,291 | B1 | 11/2003 | West et al. | |
| 10,075,219 | B1 * | 9/2018 | Lipworth | H04B 7/046 |
| 2007/0151924 | A1 * | 7/2007 | Mir | B01D 63/08 210/321.88 |
| 2012/0319900 | A1 * | 12/2012 | Johansson | H01Q 21/26 342/368 |
| 2015/0116158 | A1 * | 4/2015 | Alrabadi | H01Q 1/243 343/702 |
| 2017/0365924 | A1 * | 12/2017 | Topak | H01Q 21/061 |
| 2018/0048064 | A1 | 2/2018 | Boutayeb et al. | |
| 2018/0175500 | A1 * | 6/2018 | Thorebäck | H01Q 3/40 |
| 2018/0269579 | A1 * | 9/2018 | Bartone | H01Q 9/045 |

FOREIGN PATENT DOCUMENTS

| | | |
|---|---|---|
| TW | 201145677 | 12/2011 |
| TW | 201409834 | 3/2014 |
| WO | 2018103856 | 6/2018 |

OTHER PUBLICATIONS

"Office Action of Taiwan Counterpart Application", dated Apr. 10, 2020, p. 1-p. 7.

"Office Action of China Counterpart Application", dated Jan. 15, 2021, pp. 1-10.

* cited by examiner

ANTENNA APPARATUS, COMMUNICATION APPARATUS AND STEERING ADJUSTMENT METHOD THEREOF

CROSS-REFERENCE TO RELATED APPLICATION

This application claims the priority benefits of U.S. provisional application Ser. No. 62/807,712, filed on Feb. 19, 2019, and Taiwan application serial no. 108129736, filed on Aug. 21, 2019. The entirety of each of the above-mentioned patent applications is hereby incorporated by reference herein and made a part of this specification.

BACKGROUND

Technical Field

The disclosure relates to an antenna technology, and in particular, to a multi-polarized antenna apparatus, a communication apparatus, and a steering adjustment method thereof.

Description of Related Art

Electromagnetic waves emitted by an antenna may form an electric field and a magnetic field, and a direction of the electric field is an antenna polarized direction. The electromagnetic waves that may be received and/or emitted by antennae with different polarization characteristics may be different because of different antenna polarized directions. However, if an antenna polarized direction is different from a direction where an electromagnetic wave is received, polarization loss may be caused. In recent years, antenna designs capable of forming electromagnetic waves in multiple electric field directions have been proposed in the industry and by researchers. For controlling designated directions of antenna beams in the elevation and the azimuth, a plurality of antenna elements may be combined in part of designs. However, such designs may greatly enlarge the arrangement area of an antenna structure and further make it inapplicable to an electronic device with a compact design.

SUMMARY

In view of this, embodiments of the disclosure provide an antenna apparatus, a communication apparatus, and a steering adjustment method thereof. The area of an antenna structure may be reduced, and a relatively good antenna effect may be achieved.

An antenna apparatus of the embodiments of the disclosure includes an antenna structure. The antenna structure includes an antenna unit. The antenna unit includes i feeding ports, where i is a positive integer larger than 2. A vector of each feeding port is controlled independently.

A communication apparatus of the embodiments of the disclosure includes the aforementioned antenna apparatus and a controller. The controller is electrically connected to the antenna apparatus. The controller is configured to execute the following steps: the vectors of the feeding ports are set according to a designated direction, and the designated direction corresponds to beam directionality of the antenna structure.

According to another aspect, a steering adjustment method of the embodiments of the disclosure is applied to an antenna structure. The steering adjustment method includes the following steps: providing an antenna unit in the antenna structure, wherein each antenna unit includes i feeding ports and i is a positive integer larger than 2; determining a designated direction, wherein the designated direction corresponds to beam directionality of the antenna structure; and setting vectors of the feeding ports of the antenna unit according to the designated direction, wherein the vector of each feeding port of the antenna unit is controlled independently.

Based on the above, according to the antenna apparatus, the communication apparatus and the steering adjustment method thereof of the embodiments of the disclosure, a multi-polarized antenna unit capable of controlling a feeding signal vector independently/separately is provided. One or more antenna units form an antenna array structure, and for such an antenna structure, vector configurations corresponding to different polarized directions may be set individually to form beams facing the designated direction. Compared with the conventional art, the embodiments of the disclosure have the advantages that the antenna size is relatively small but a similar or better effect may be achieved.

In order to make the aforementioned advantages of the disclosure comprehensible, embodiments accompanied with figures are described in detail below.

DESCRIPTION OF THE EMBODIMENTS

Figure 1:
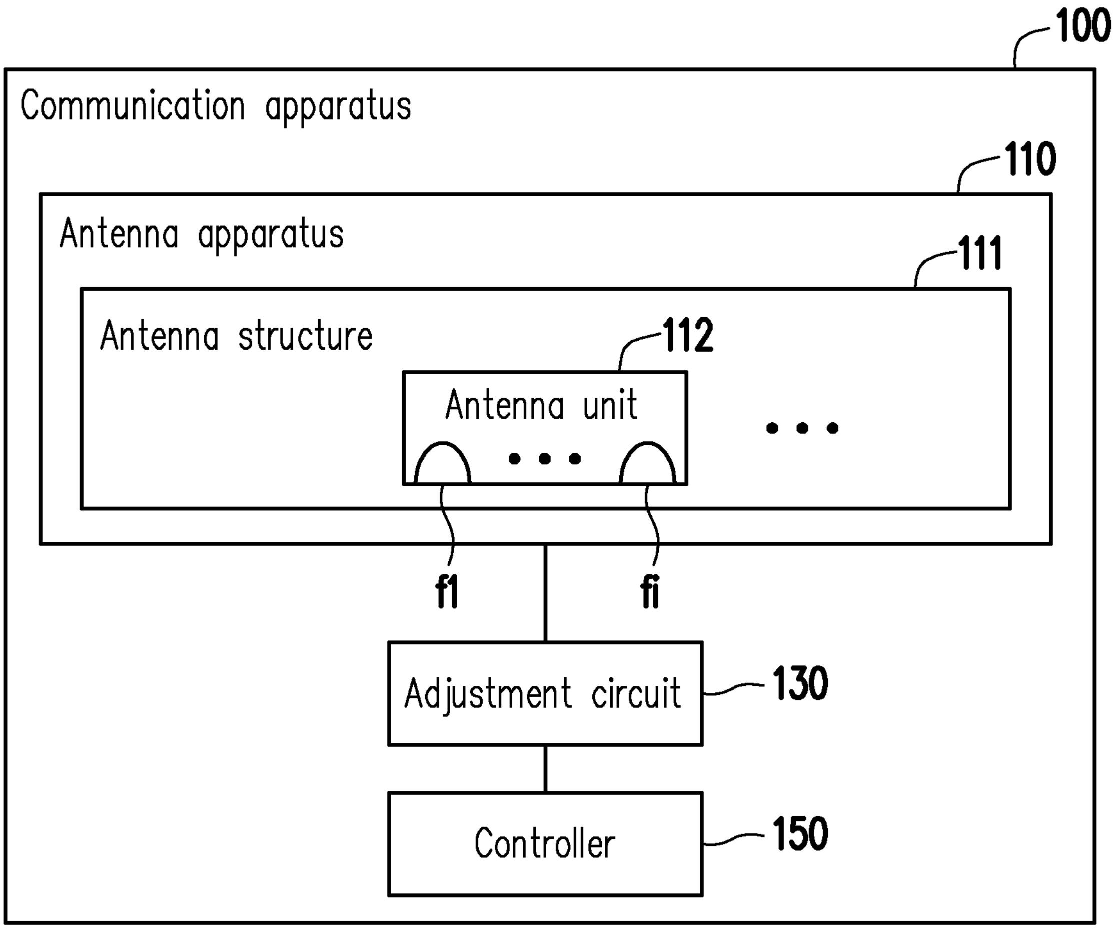
FIG. 1 is a block diagram of elements of a communication apparatus according to an embodiment of the disclosure.

FIG. 1 is a block diagram of elements of a communication apparatus 100 according to an embodiment of the disclosure. Referring to FIG. 1, the communication apparatus 100 includes, but is not limited to, an antenna apparatus 110, an adjustment circuit 130 and a controller 150. The communication apparatus 100 may be an apparatus such as a mobile phone, a tablet computer, a handheld game console, a wireless router and a base station.

The antenna apparatus 110 includes an antenna structure 111. The antenna structure 111 includes one or more antenna units 112. Each antenna unit 112 at least includes a radiation portion (not shown in the figure) and feeding ports f1 to fi. It is to be noted that a shape or type of the radiation portion is not limited in the embodiment of the disclosure and it may be designed according to a practical requirement to support any communication system (for example, a wireless local area network (WLAN) and various wireless wide area networks (WWAN) (for example, 4th-generation, 5th-generation or next-generation mobile communication)) and support any one or more frequency bands.

Figure 2A:
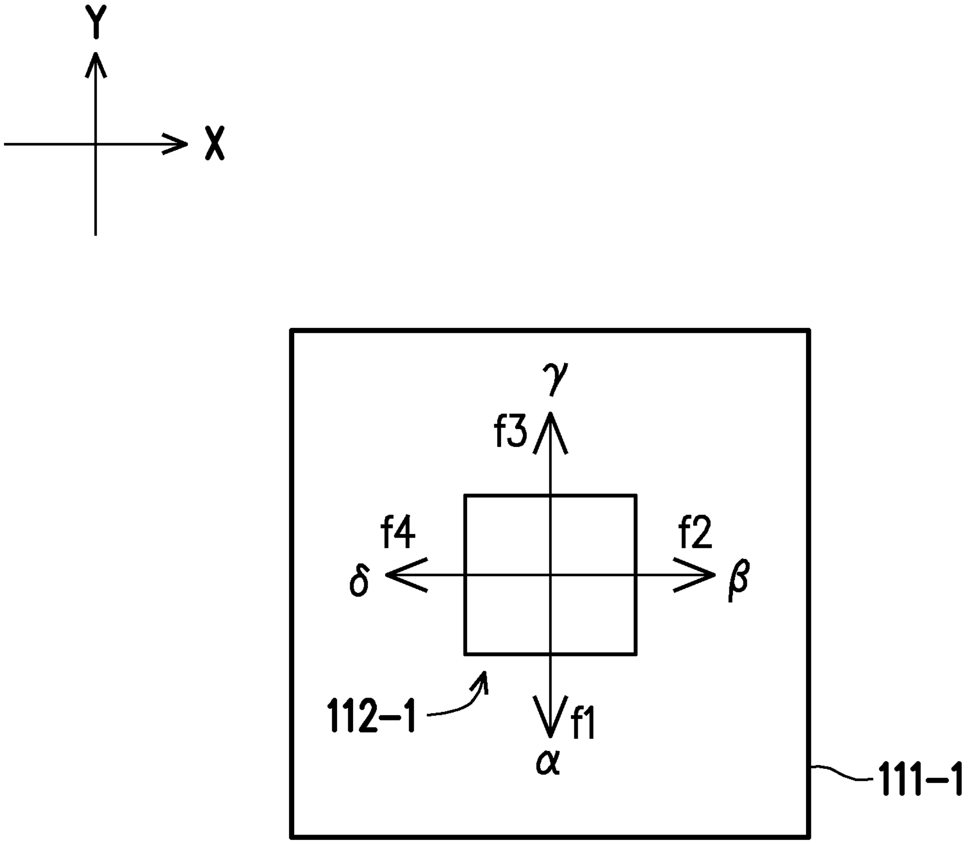
FIG. 2A is a schematic diagram of an antenna structure according to a first embodiment of the disclosure.

It is to be noted that each antenna unit 112 in the embodiment of the disclosure includes more than two feeding ports f1 to fi (namely i is a positive integer larger than 2). FIG. 2A is a schematic diagram of an antenna structure 111-1 according to a first embodiment of the disclosure. Referring to FIG. 2A, the antenna structure 111-1 includes an antenna unit 112-1. The antenna unit 112-1 is a quadruple-polarized antenna, and includes four feeding ports f1 to f4 (assumed to correspond to feeding signals α, β, γ and δ respectively) respectively. It is to be noted that the four feeding ports f1 to f4 that are orthogonal to one another in the quadruple-polarized antenna may provide relatively good isolation and electric correlation coefficient (ECC) and may improve the gain better. In the present embodiment, feeding directions of the feeding ports f1 and f3 at the top and bottom of the figure extend forwards and backwards along a Y direction (namely extending directions of the two feeding ports f1 and f3 are opposite), and feeding directions of the feeding ports f2 and f4 at left and right portions of the figure extend forwards and backwards along an X direction (namely extending directions of the two feeding ports f2 and f4 are opposite).

Figure 2B:
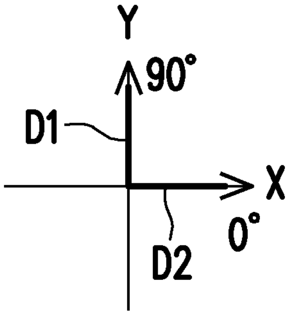
FIG. 2B and FIG. 2C are schematic diagrams of polarized directions according to an embodiment of the disclosure.
Figure 2C:
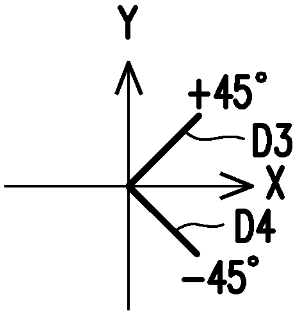

The feeding signals α and γ of the feeding ports f1 and f3 and the feeding signals β and δ of the feeding ports f2 and f4 are configured to form beams in two polarized directions that are mutually orthogonal respectively. For example, FIGS. 2B and 2C are schematic diagrams of polarized directions according to an embodiment of the disclosure. Referring to FIG. 2B at first, the feeding signals α and γ of the feeding ports f1 and f3 may form a 90-degree polarized direction D1, and the feeding signals β and δ of the feeding ports f2 and f4 may form a 0-degree polarized direction D2.

Figure 2D:
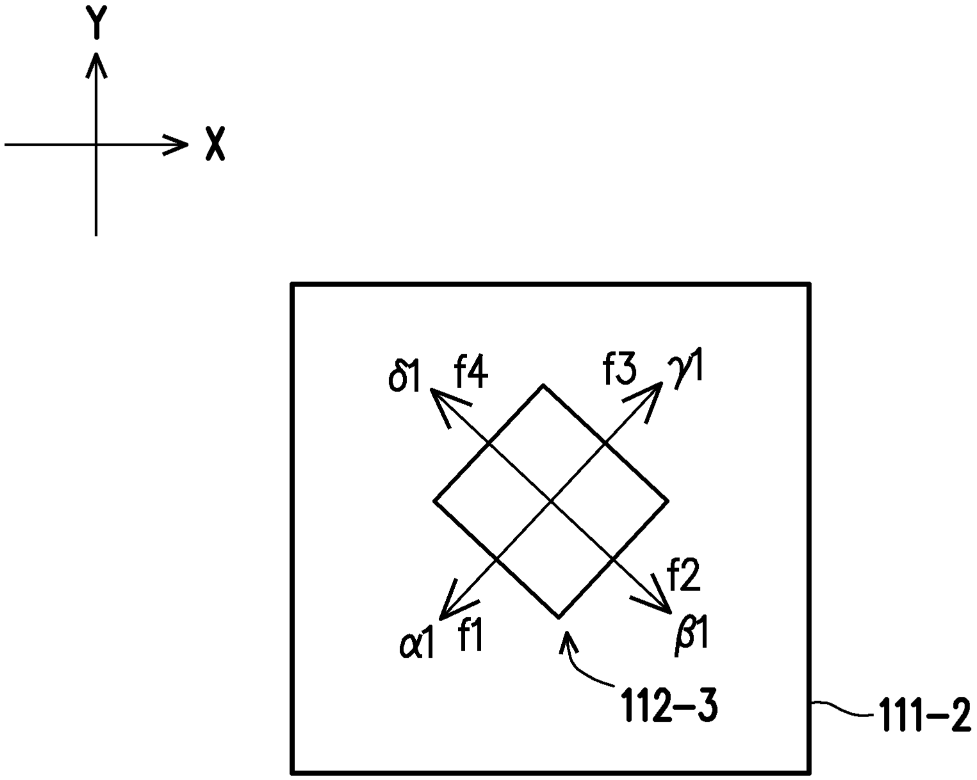
FIG. 2D is a schematic diagram of an antenna structure according to a second embodiment of the disclosure.

In the embodiment of the disclosure, different antenna designs may also be proposed for other directions, besides the 0-degree and 90-degree polarized directions. FIG. 2D is a schematic diagram of an antenna structure 111-2 according to a second embodiment of the disclosure. Referring to FIG. 2D, the antenna structure 111-2 includes an antenna unit 112-3. The difference from the first embodiment shown in FIG. 2A is that the feeding directions of the feeding ports f1 and f3 (assumed to correspond to feeding signals α1 and γ1 respectively) at lower left and upper right portions of the figure extend along −135-degree and +45-degree directions between the X and Y directions (namely the extending directions of the two feeding ports f1 and f3 are opposite), and the feeding directions of feeding ports f2 and f4 (assumed to correspond to feeding signals β1 and δ1 respectively) at lower right and upper left portions of the figure extend along −45-degree and +135-degree directions between the X and Y directions (namely the extending directions of the two feeding ports f2 and f4 are opposite).

Figure 3:
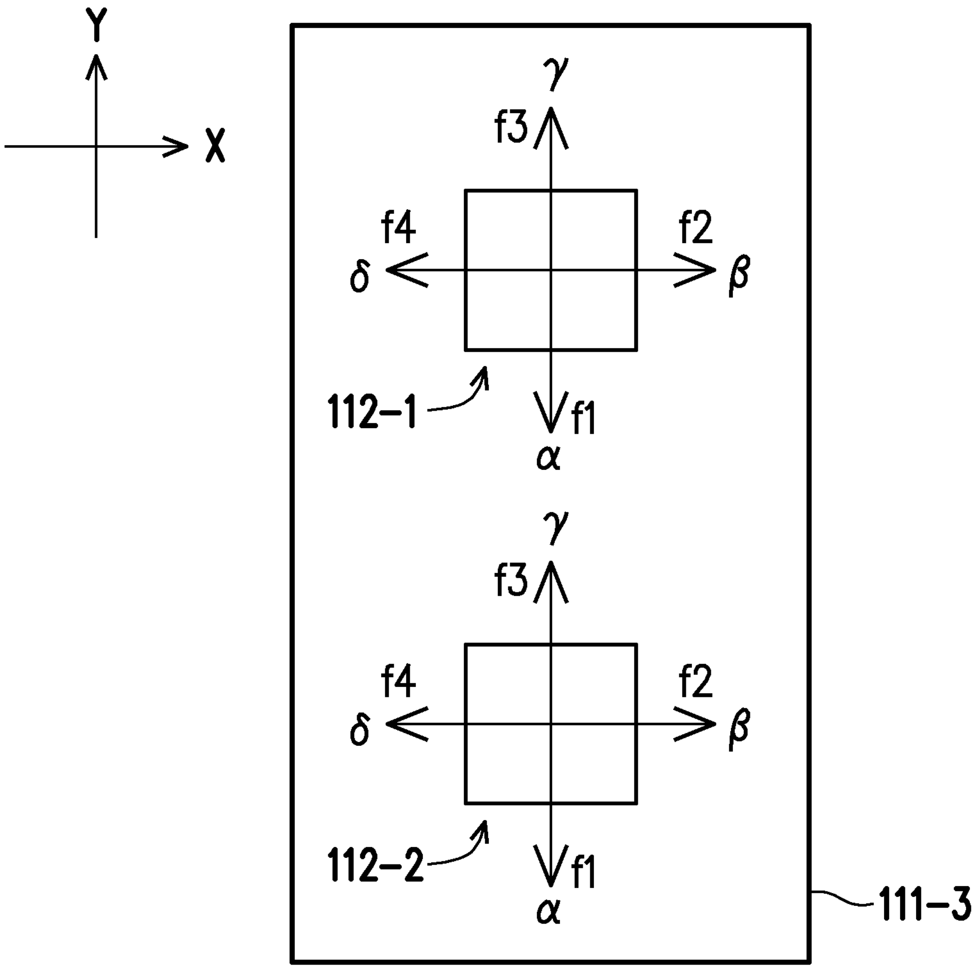
FIG. 3 is a schematic diagram of an antenna structure according to a third embodiment of the disclosure.

For further improving the antenna efficiency, the antenna structure 111-1 of the first embodiment may be further extended. FIG. 3 is a schematic diagram of an antenna structure 111-3 according to a third embodiment of the disclosure. Referring to FIG. 3, the difference from the first embodiment shown in FIG. 2A is that the antenna structure 111-3 further includes another antenna unit 112-2, to form a 2×1 antenna array. The antenna unit 112-2 is also a quadruple-polarized antenna, and includes four feeding ports f1 to f4 (assumed to correspond to feeding signals α, β, γ and δ respectively) respectively. It is to be noted that the feeding directions of the feeding ports f1 to f4 of the two antenna units 112-1 and 112-2 correspond to each other. For example, the feeding directions of the same feeding ports f1 to f4 are the same. In addition, an imaginary extending line connecting the two feeding ports f1 and f3 of the antenna unit 112-1 may be connected to the two feeding ports f1 and f3 of the antenna unit 112-2, but the embodiment of the disclosure is not limited thereto (namely two imaginary extending lines may be offset and dislocated).

Figure 4:
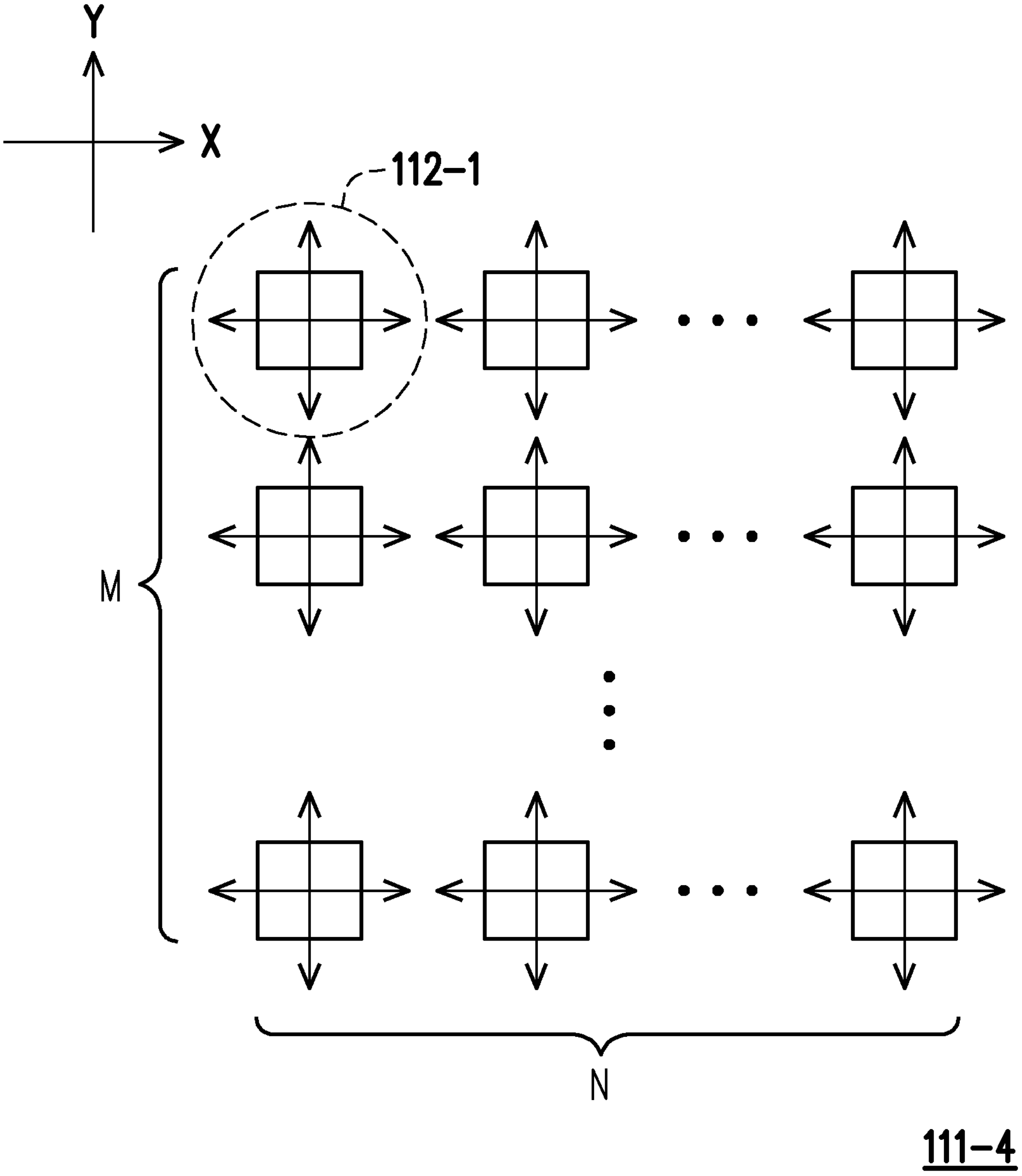
FIG. 4 is a schematic diagram of an antenna structure according to a fourth embodiment of the disclosure.

FIG. 4 is a schematic diagram of an antenna structure 111-4 according to a fourth embodiment of the disclosure. Referring to FIG. 4, the antenna structure 111-4 includes M×N antenna units 112-1 (which may also be antenna units 112-2 in FIG. 3), M being a positive integer larger than 1 and N being a positive integer larger than 0, to form an M×N antenna array. Like the third embodiment, feeding directions of the feeding ports f1 to f4 of these antenna units 112-1 correspond to each other. For example, the feeding directions of the same feeding ports f1 to f4 are the same. In addition, an imaginary extending line connecting the two feeding ports f1 and f3 of the antenna unit 112-1 may be connected to the two feeding ports f1 and f3 of the other antenna unit 112-1 above or below it, but the embodiment of the disclosure is not limited thereto (namely two imaginary extending lines may be offset and dislocated); and an imaginary connecting line connecting the two feeding ports f2 and f4 of the antenna unit 112-1 may be connected to the two feeding ports f2 and f4 of the other antenna unit 112-1 on the left or right thereof, but the embodiment of the disclosure is not limited thereto (namely two imaginary extending lines may be offset or dislocated). That is, each antenna unit 112-1 is arranged along the X and Y directions.

Figure 5:
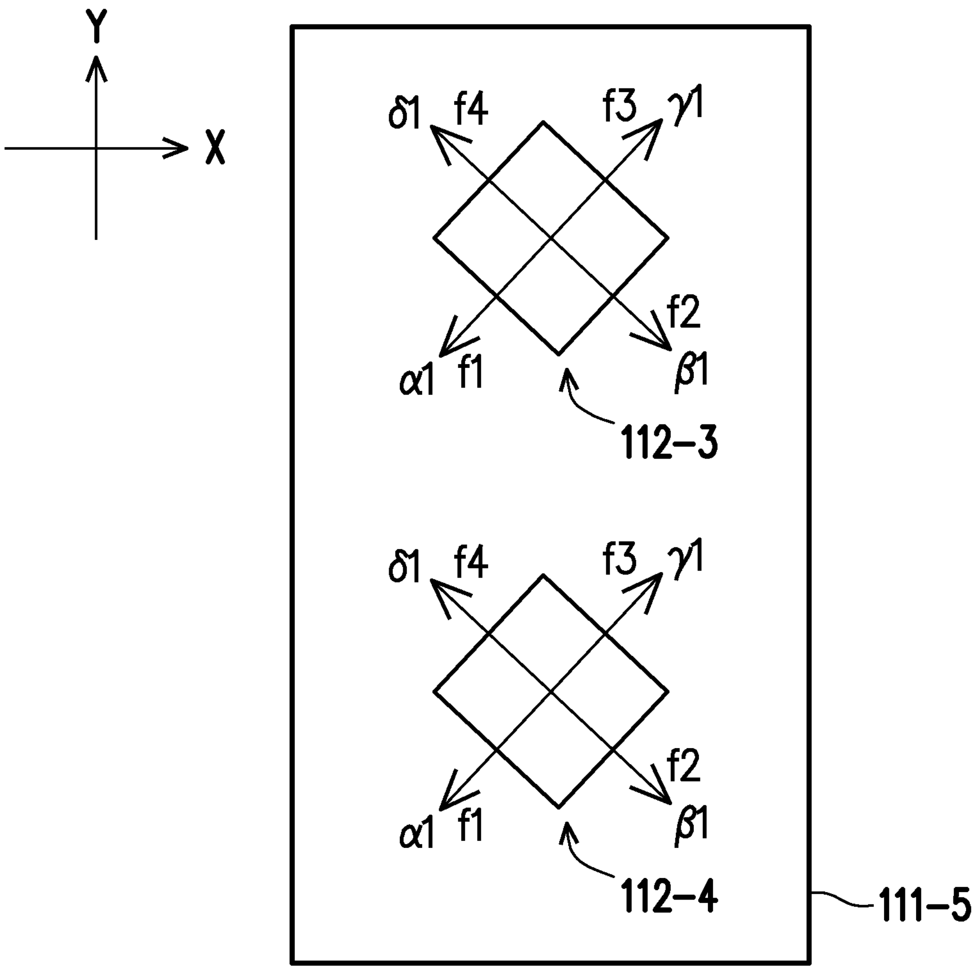
FIG. 5 is a schematic diagram of an antenna structure according to a fifth embodiment of the disclosure.

FIG. 5 is a schematic diagram of an antenna structure 111-5 according to a fifth embodiment of the disclosure. Referring to FIG. 5, the difference from the second embodiment shown in FIG. 2D is that the antenna structure 111-5 further includes an antenna unit 112-4. The antenna unit 112-4 is also a quadruple-polarized antenna, and includes four feeding ports f1 to f4 (assumed to correspond to feeding signals α1, β1, γ1 and δ1 respectively) respectively. Similarly, feeding directions of the feeding ports f1 to f4 of the two antenna units 112-3 and 112-4 correspond to each other. For example, the feeding directions of the same feeding ports f1 to f4 are the same.

Referring to both FIG. 2C and FIG. 5, the feeding signals α1 and γ1 of the feeding ports f1 and f3 may form a +45-degree polarized direction D3, and the feeding signals β1 and δ1 of the feeding ports f2 and f4 may form a −45-degree polarized direction D4. That is, the two polarized directions D3 and D4 are orthogonal.

Figure 6:
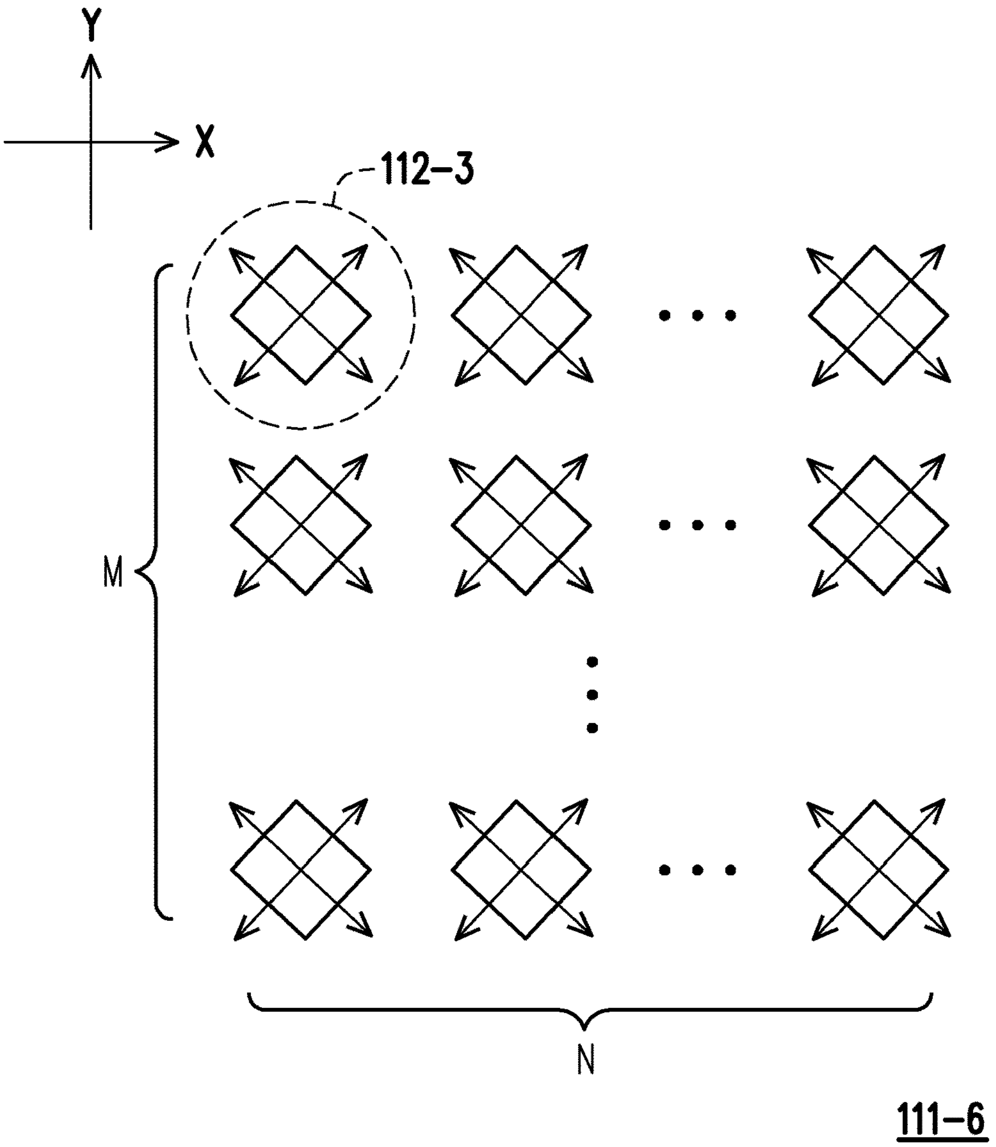
FIG. 6 is a schematic diagram of an antenna structure according to a sixth embodiment of the disclosure.

FIG. 6 is a schematic diagram of an antenna structure 111-6 according to a sixth embodiment of the disclosure. Referring to FIG. 6, the antenna structure 111-6 includes M×N antenna units 112-3 (which may also be antenna units 112-4 in FIG. 5), M being a positive integer larger than 1 and N being a positive integer larger than 0. Like the fourth embodiment, feeding directions of the feeding ports f1 to f4 of these antenna units 112-3 correspond to each other. For example, the feeding directions of the same feeding ports f1 to f4 are the same. In addition, an imaginary extending line connecting the two feeding ports f1 and f3 of the antenna unit 112-3 is parallel to an imaginary extending line connected to the two feeding ports f1 and f3 of the other antenna unit 112-3 above the right thereof or below the left thereof; and an imaginary extending line connecting the two feeding ports f2 and f4 of the antenna unit 112-3 is parallel to an imaginary extending line connected to the two feeding ports f2 and f4 of the other antenna unit 112-3 above the left thereof or below the right thereof. Each antenna unit 112-3 is arranged along the X and Y directions.

It is to be noted that the embodiment of the disclosure is not limited to the polarized directions D1 to D4 shown in FIGS. 2B and 2C. The quantity of the feeding ports f1 to fi is not limited to four, and the feeding directions of the feeding ports f1 to fi are not always as shown in FIG. 2A, FIG. 2D and FIGS. 3 to 6. In addition, arrangement patterns shown in FIG. 2A, FIG. 2D and FIGS. 3 to 5 are only for exemplary description and different arrangement patterns may be adopted in other embodiments.

Referring to FIG. 1, the adjustment circuit 130 is electrically connected to each antenna unit 112 in the antenna structure 111. According to different design requirements, the adjustment circuit 130 may include, but is not limited to, an electronic component such as a switch, a divider and a phase adjuster, and a circuit composition thereof will be elaborated in subsequent embodiments. The adjustment circuit 130 may also be a controller such as a chip, a digital circuit and an application-specific integrated circuit (ASIC). In the embodiment of the disclosure, the adjustment circuit 130 is used for regulating vectors (i.e., phases and/or amplitudes) of feeding signals input to the feeding ports f1 to fi.

The controller 150 is electrically connected to the antenna apparatus 110 and the adjustment circuit 130. The controller 150 may be a central processing unit (CPU), or another programmable microprocessor for a general purpose or a special purpose, a digital signal processor (DSP), a programmable controller, an ASIC or another similar component or a combination of the components. In the embodiment of the disclosure, the controller 150 is used for executing all operations of the communication apparatus 100 and may load and execute various software programs/modules, documents and data.

For conveniently understanding an operating flow of the embodiment of the disclosure, a running flow of the communication apparatus 100 in the embodiment of the disclosure will be described with a plurality of embodiments in detail. The method of the embodiment of the disclosure will be described below in combination with each element and module of the communication apparatus 100 in FIG. 1. Each flow of the method may be regulated according to a practical condition but is not limited thereto.

Figure 7:
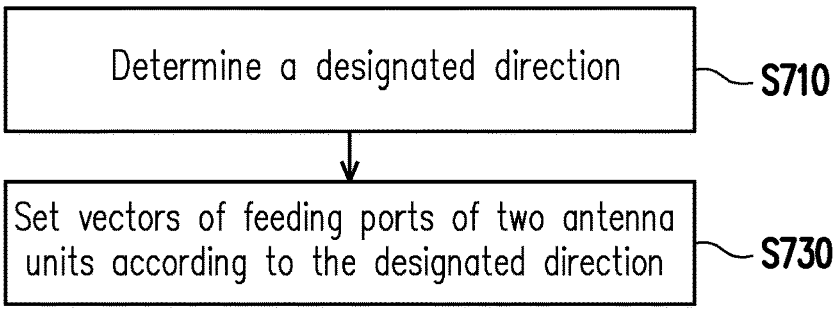
FIG. 7 is a flowchart of a steering adjustment method according to an embodiment of the disclosure.

FIG. 7 is a flowchart of a steering adjustment method according to an embodiment of the disclosure. Referring to FIG. 7, the controller 150 determines a designated direction (S710). Specifically, the designated direction corresponds to beam directionality of the antenna structure 111. In other words, the designated direction is related to an orientation of a beam pattern formed by the antenna apparatus 110. The controller 150 may determine the designated direction according to a content input by a user through an input apparatus (for example, a touch panel, a button, a switch, a mouse or a keyboard) or a preset direction. For example, the communication apparatus 100 is provided with a shift switch, and shift to different directions in the azimuth may be implemented through the shift switch. Or, when the communication apparatus 100 detects another external apparatus at a specific angle in the elevation, the controller 150 may set a direction facing the external apparatus as the designated direction. The user may independently make adjustment like this according to the practical requirement.

Then, the controller 150 sets vectors of the feeding ports f1 to fi of the antenna unit 112 in the antenna apparatus 110 according to the designated direction (S630). In the embodiment of the disclosure, the vectors of the feeding ports f1 to fi of the antenna unit 112 may be controlled independently/separately. Independent control refers to that a vector configuration of any one of the feeding ports f1 to fi may be adjusted individually according to the requirement regardless of the vectors of the other feeding ports f1 to fi. In addition, there is no linear relationship between adjustment over the vectors of any one of the feeding ports f1 to fi and another of the feeding ports f1 to fi. For example, a phase difference between the feeding ports f1 and f3 is a variable value; or, only the vector of the feeding port f2 is adjusted. Moreover, by use of the antenna structures 111-1 to 111-6 (at least including the 1×1 antenna unit 112) shown in FIG. 2A, FIG. 2D and FIGS. 3 to 6, the antenna apparatus 110 may adjust directions of beams in the azimuth and the elevation.

In an embodiment, orientations of the beams formed by the antenna structure 111 form corresponding relationships with the vector configurations of the feeding ports f1 to fi. The controller 150 may record different assumed directions corresponding to the vector configurations of the feeding ports f1 to fi of the antenna unit 112 in advance. The corresponding relationships may be obtained by experience or other references. Then, the controller 150 determines the vector configuration corresponding to at least one assumed direction according to the designated direction selected in S710. For example, when the designated direction is equal to a certain assumed direction, the controller 150 may set the vectors of the feeding ports f1 to fi according to the vector configurations of the feeding ports f1 to fi corresponding to the assumed direction in the corresponding relationships. Or, when the designated direction is between two assumed directions, the controller 150 may set the vectors of the feeding ports f1 to fi according to the vector configurations corresponding to the two assumed directions in the corresponding relationships.

For example, Table (1) presents corresponding relationships in the 0/90-degree polarized direction in the antenna structure 111-1 of the first embodiment (the feeding ports f1 and f3 are controlled).

TABLE (1)

| Excitation | Phase of feeding signal α(112-1$^{\alpha}$) of antenna unit 112-1 | Phase of feeding signal γ(112-1$^{\gamma}$) of antenna unit 112-1 | Amplitude of feeding signal α(112-1$^{\alpha}$) of antenna unit 112-1 | Amplitude of feeding signal γ(112-1$^{\gamma}$) of antenna unit 112-1 |
|---|---|---|---|---|
| Value definition | 0 to 2π ± 2nπ(n is a positive integer) | 0 to 2π ± 2nπ | Real number | Real number |

Based on the determined designated direction, the controller 150 may adjust phases of the feeding signals α and γ of the antenna unit 112-1 and accordingly adjust the directions of the antenna beams in the elevation. For example, the antenna beams are toward the top and the bottom.

In addition, beam directions in a plurality of directions may be formed only by controlling the vectors of the feeding ports f1 and f3 in a single polarized direction (adjustment over the vectors of the feeding ports f2 and f4 in another polarized direction is disabled/avoided/stopped).

Figure 8A:
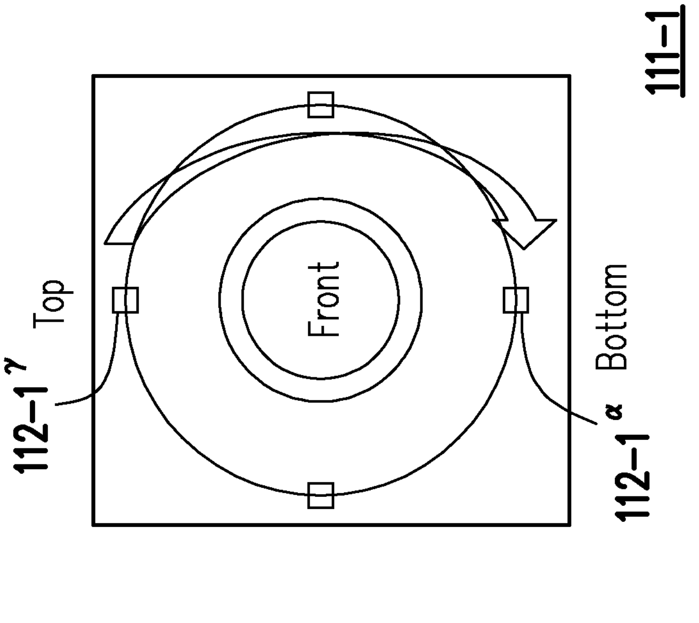
FIG. 8A and FIG. 8B are schematic diagrams of controlling beam shapes in the elevation for a 0/90-degree polarized direction according to the first embodiment of the disclosure.
Figure 8B:
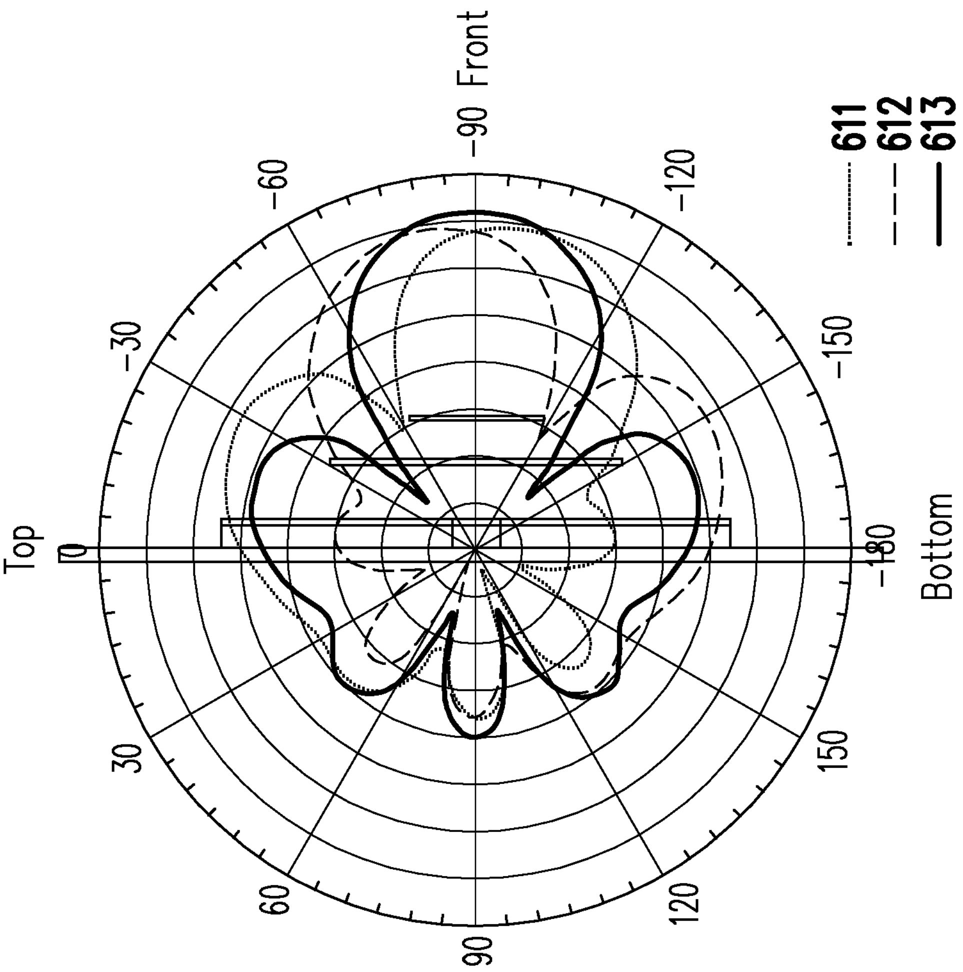

FIG. 8A and FIG. 8B are schematic diagrams of controlling beam shapes in the elevation direction for a 0/90-degree polarized direction according to the first embodiment of the disclosure. Referring to FIG. 8A and FIG. 8B, the vectors of the feeding ports f1 and f3 are adjusted, and then beams 611, 612 and 613 are in patterns formed for directions toward the bottom, the top and the front respectively. Compared with the beam 613, the beam 611 is toward the bottom more; and compared with the beam 613, the beam 612 is toward the top more.

Table (2) presents corresponding relationships in the 0/90-degree polarized direction in the antenna structure 111-1 of the first embodiment (the feeding ports f2 and f4 are controlled).

TABLE (2)

| Excitation | Phase of feeding signalβ(112-1$^{\beta}$) of antenna unit 112-1 | Phase of feeding signal δ(112-1$^{\delta}$) of antenna unit 112-1 | Amplitude of feeding signalβ(112-1$^{\beta}$) of antenna unit 112-1 | Amplitude of feeding signal δ(112-1$^{\delta}$) of antenna unit 112-1 |
|---|---|---|---|---|
| Value definition | 0 to 2π ± 2nπ | 0 to 2π ± 2nπ | Real number | Real number |

Based on the determined designated direction, the controller 150 may adjust phases of the feeding signals β and δ of the antenna unit 112-1 and accordingly adjust the directions of the antenna beams in the azimuth. For example, the antenna beams are toward the left and the right.

In addition, beam directions in a plurality of directions may be formed only by controlling the vectors of the feeding ports f2 and f4 in a single polarized direction (adjustment over the vectors of the feeding ports f1 and f3 in another polarized direction is disabled/avoided/stopped).

Figure 8C:
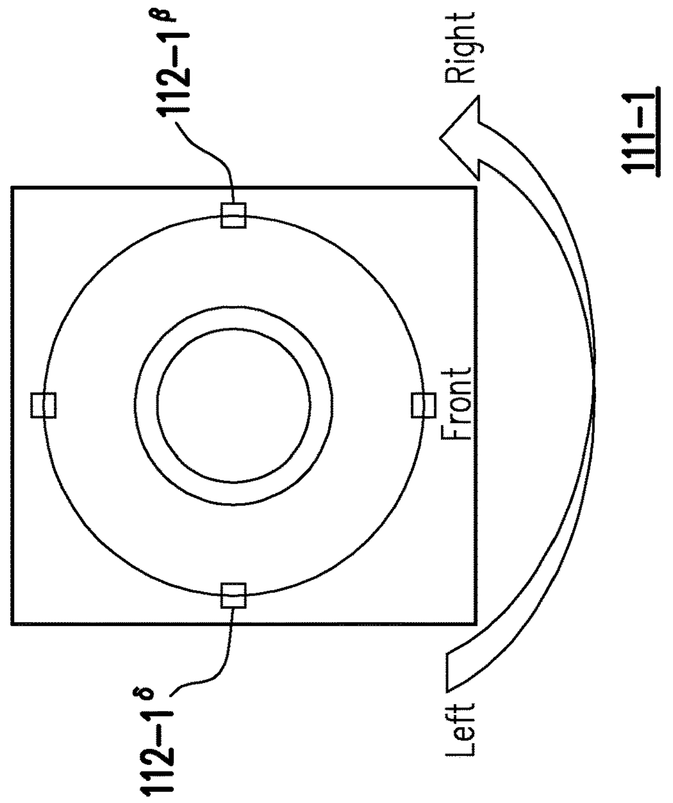
FIG. 8C and FIG. 8D are schematic diagrams of controlling beam shapes in the azimuth for a 0/90-degree polarized direction according to the first embodiment of the disclosure.
Figure 8D:
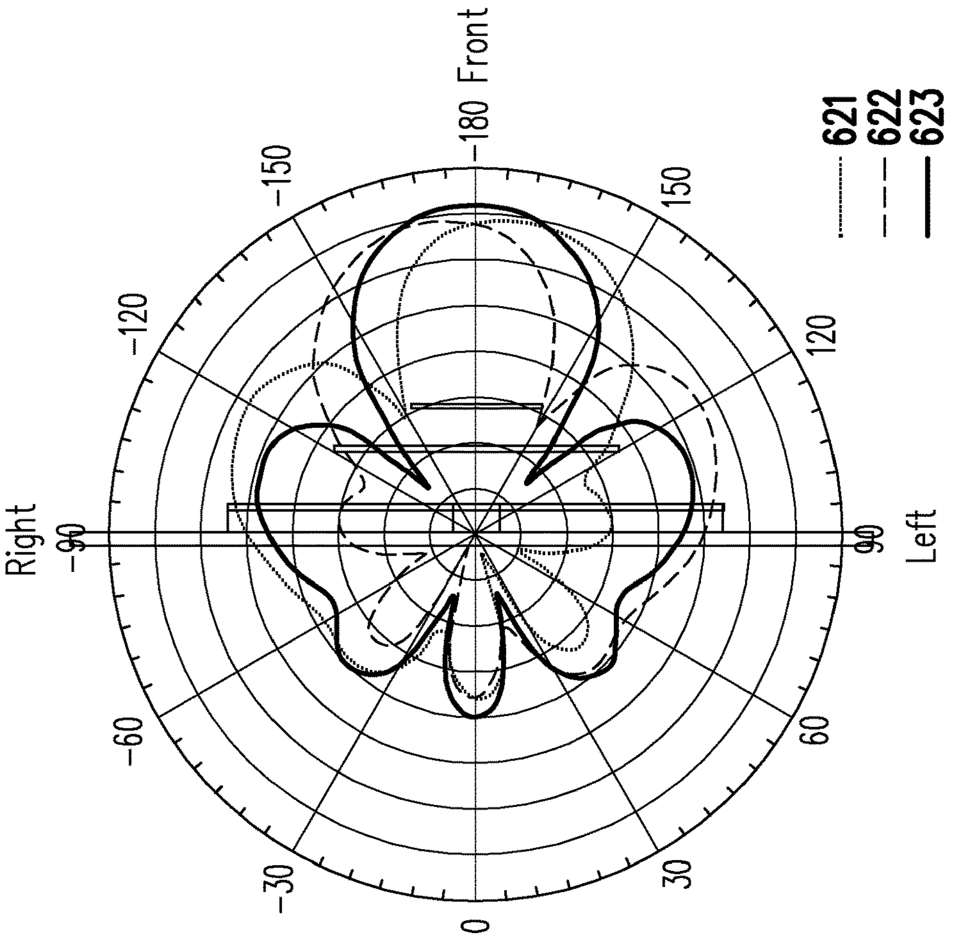

FIG. 8C and FIG. 8D are schematic diagrams of controlling beam shapes in the azimuth for a 0/90-degree polarized direction according to the first embodiment of the disclosure. Referring to FIG. 8C and FIG. 8D, the vectors of the feeding ports f2 and f4 are adjusted, and then beams 621, 622 and 623 are in patterns formed for directions toward the left, the right and the front respectively. Compared with the beam 623, the beam 621 is toward the left more; and compared with the beam 623, the beam 622 is toward the right more.

Figure 9A:
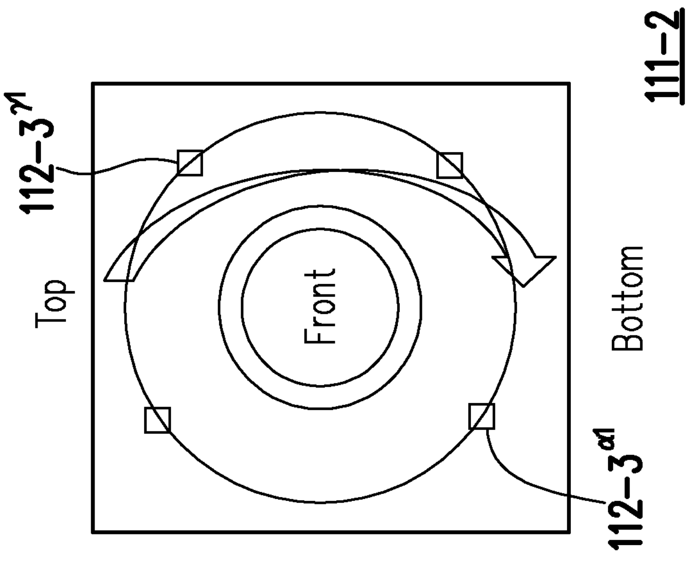
FIG. 9A and FIG. 9B are schematic diagrams of controlling beam shapes in the elevation for a +45-degree polarized direction according to the second embodiment of the disclosure.
Figure 9B:
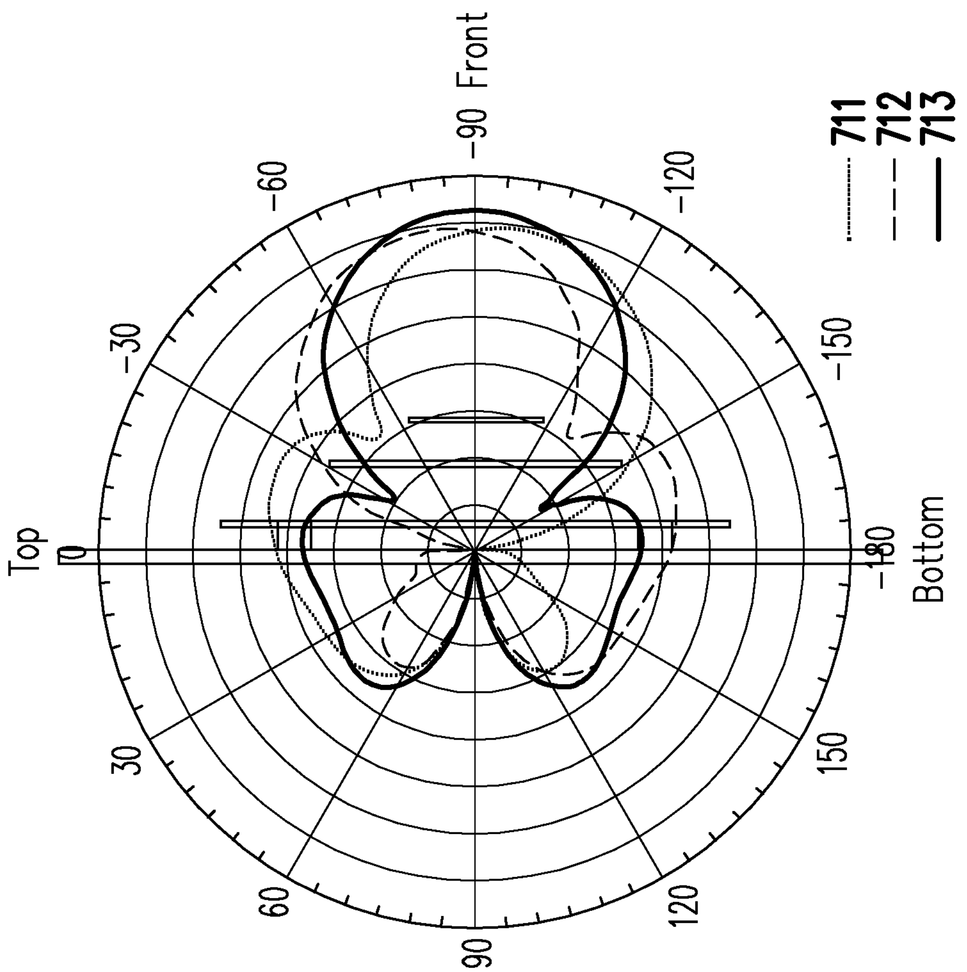

FIG. 9A and FIG. 9B are schematic diagrams of controlling beam shapes in the elevation direction for a +45-degree polarized direction according to the second embodiment of the disclosure. Referring to FIG. 9A and FIG. 9B, the vectors of the feeding ports f1 and f3 are adjusted, and then beams 711, 712 and 713 are in patterns formed for the directions toward the bottom, the top and the front respectively. Compared with the beam 713, the beam 711 is toward the bottom more; and compared with the beam 713, the beam 712 is toward the top more.

Figure 9D:
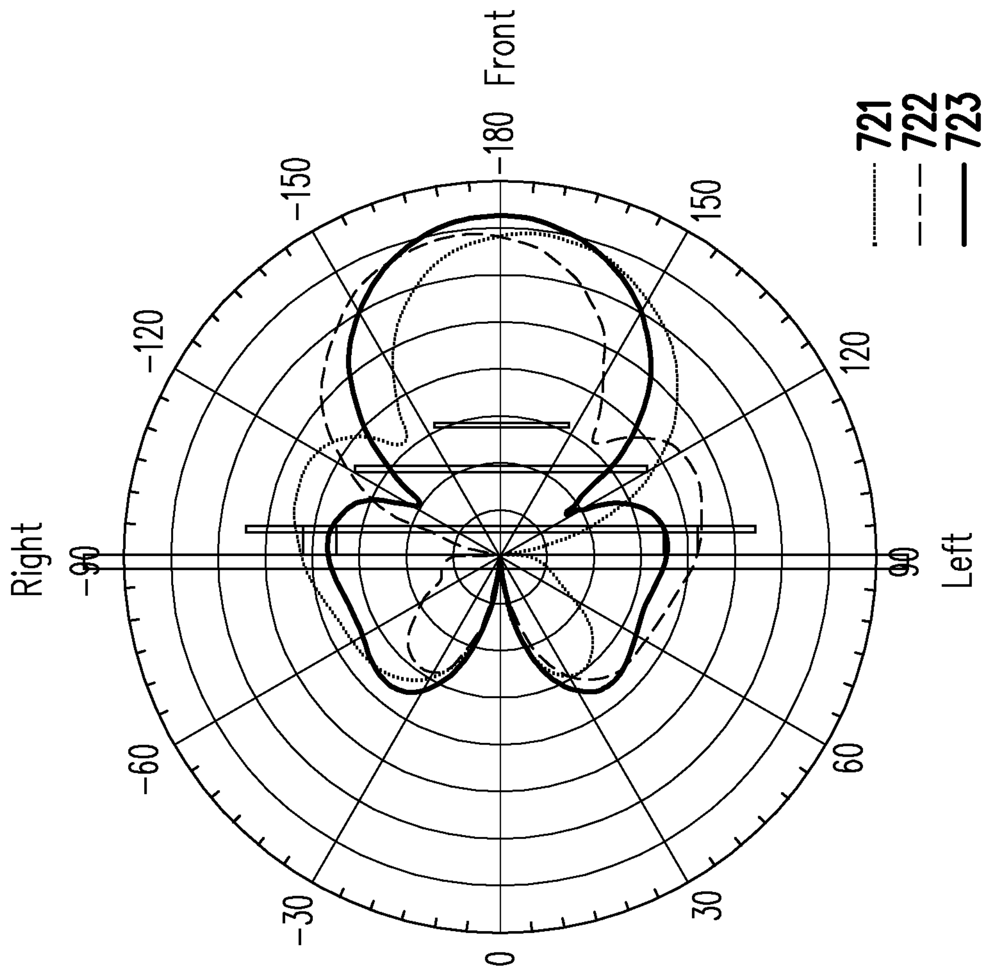
FIG. 9C and FIG. 9D are schematic diagrams of controlling beam shapes in the azimuth for a +45-degree polarized direction according to the second embodiment of the disclosure.
Figure 9C:
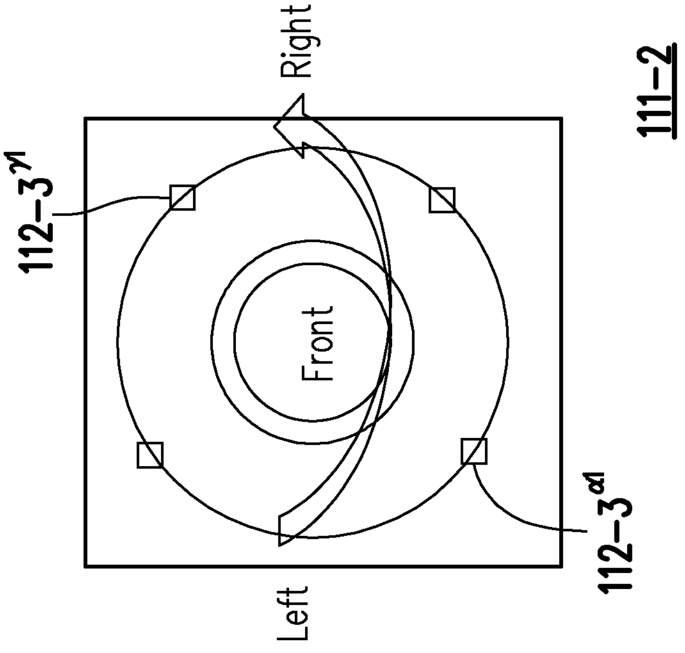

FIG. 9C and FIG. 9D are schematic diagrams of controlling beam shapes in the azimuth for a +45-degree polarized direction according to the second embodiment of the disclosure. Referring to FIG. 9C and FIG. 9D, the vectors of the feeding ports f1 and f3 are adjusted, and then beams 721, 722 and 723 are in patterns formed for the directions toward the left, the right and the front respectively. Compared with the beam 723, the beam 721 is toward the left more; and compared with the beam 723, the beam 722 is toward the right more.

Figure 9F:
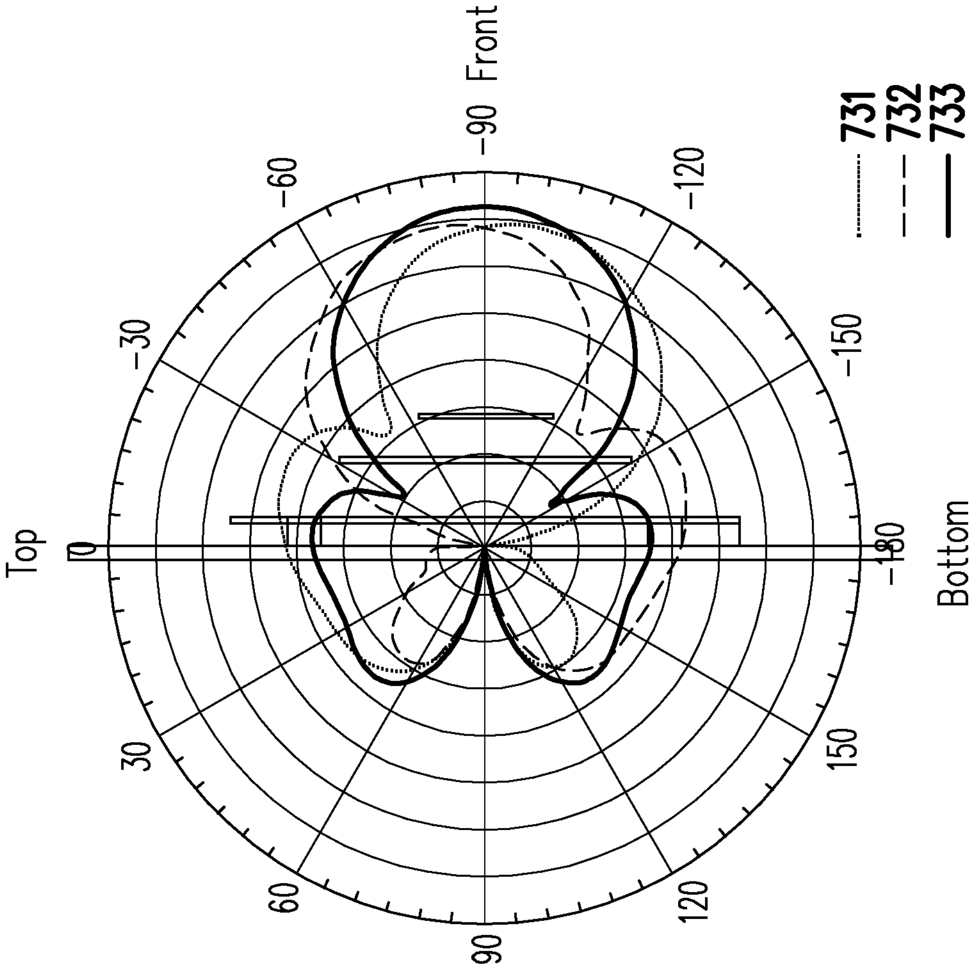
FIG. 9E and FIG. 9F are schematic diagrams of controlling beam shapes in the elevation for a −45-degree polarized direction according to the second embodiment of the disclosure.
Figure 9E:
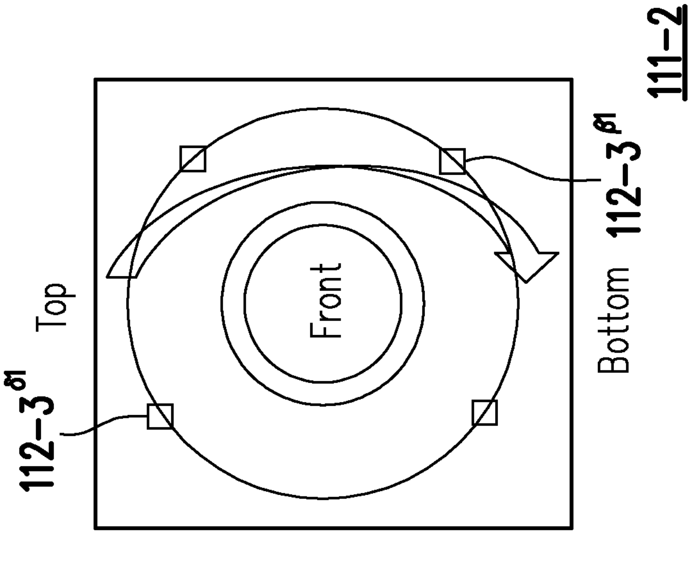

FIG. 9E and FIG. 9F are schematic diagrams of controlling beam shapes in the elevation for a −45-degree polarized direction according to the second embodiment of the disclosure. Referring to FIG. 9E and FIG. 9F, the vectors of the feeding ports f2 and f4 are adjusted, and then beams 731, 732 and 733 are in patterns formed for the direction toward the bottom, the top and the front respectively. Compared with the beam 733, the beam 731 is toward the bottom more; and compared with the beam 733, the beam 732 is toward the top more.

Figure 9H:
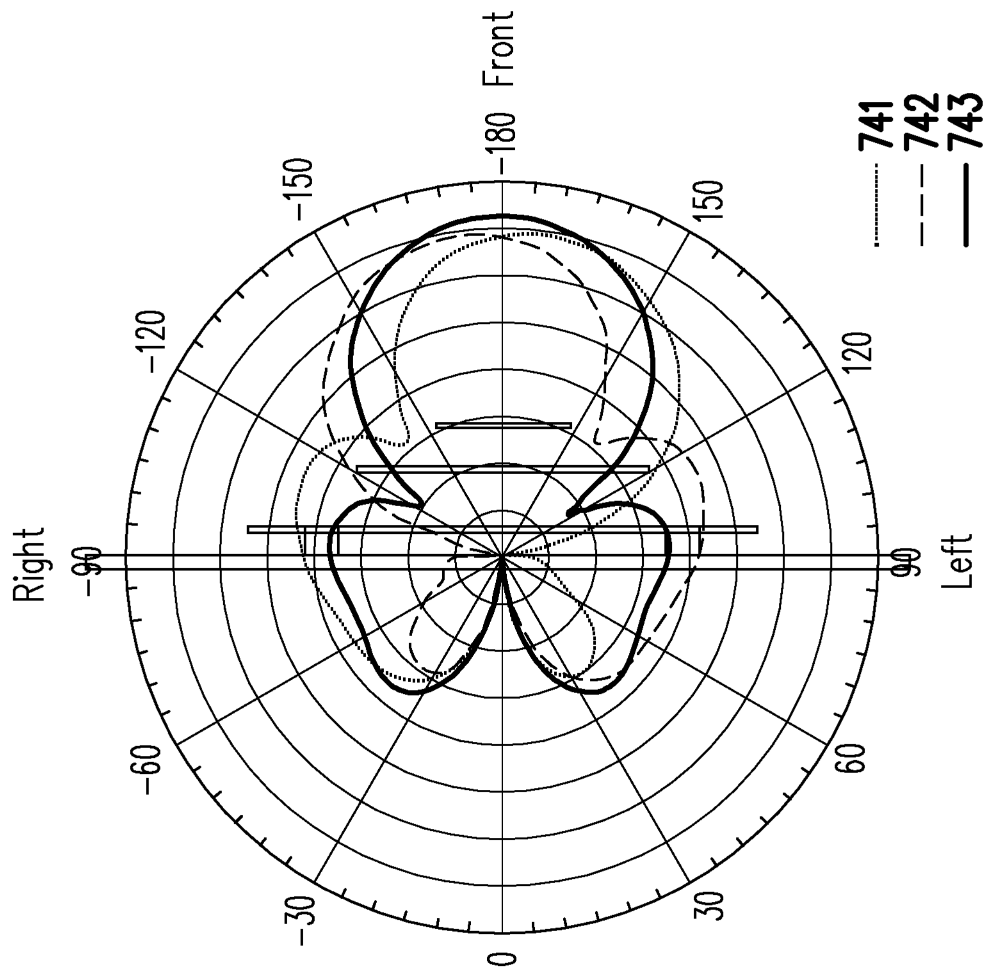
FIG. 9G and FIG. 9H are schematic diagrams of controlling beam shapes in the azimuth for a −45-degree polarized direction according to the second embodiment of the disclosure.
Figure 9G:
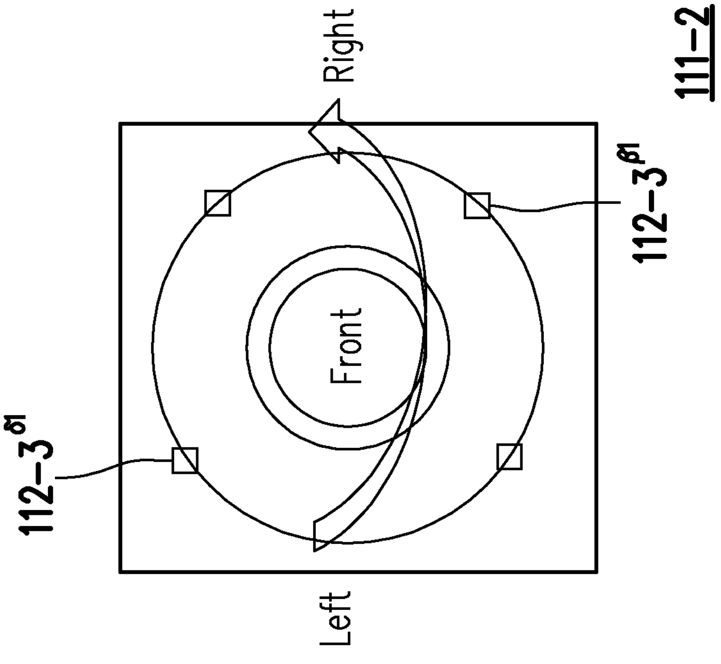

FIG. 9G and FIG. 9H are schematic diagrams of controlling beam shapes in the azimuth for a −45-degree polarized direction according to the second embodiment of the disclosure. Referring to FIG. 9G and FIG. 9H, the vectors of the feeding ports f2 and f4 are adjusted, and then beams 741, 742 and 743 are in patterns formed for the directions toward the left, the right and the front respectively. Compared with the beam 743, the beam 741 is toward the left more; and compared with the beam 743, the beam 742 is toward the right more.

Table (3) and Table (4) present corresponding relationships in the 0-degree and 90-degree polarized directions in the antenna structure 111-3 of the third embodiment (the feeding ports f1 and f3 are controlled for Table (3) and the feeding ports f2 and f4 are controlled for Table (4)).

TABLE (3)

| | | | | |
|---|---|---|---|---|
| Excitation | Phase of feeding signal $\alpha 1$(112-1$^{\alpha 1}$) of antenna unit 112-1 | Phase of feeding signal $\gamma 1$(112-1$^{\gamma 1}$) of antenna unit 112-1 | Phase of feeding signal $\alpha 1$(112-2$^{\alpha 1}$) of antenna unit 112-2 | Phase of feeding signal $\gamma 1$(112-2$^{\gamma 1}$) of antenna unit 112-2 |
| Value definition | 0 to $2\pi \pm 2n\pi$ | 0 to $2\pi \pm 2n\pi$ | 0 to $2\pi \pm 2n\pi$ | 0 to $2\pi \pm 2n\pi$ |
| Excitation | Amplitude of feeding signal $\alpha 1$(112-1$^{\alpha 1}$) of antenna unit 112-1 | Amplitude of feeding signal $\gamma 1$(112-1$^{\gamma 1}$) of antenna unit 112-1 | Amplitude of feeding signal $\alpha 1$(112-2$^{\alpha 1}$) of antenna unit 112-2 | Amplitude of feeding signal $\gamma 1$(112-2$^{\gamma 1}$) of antenna unit 112-2 |
| Value definition | Real number | Real number | Real number | Real number |

TABLE (4)

| | | | | |
|---|---|---|---|---|
| Excitation | Phase of feeding signal$\beta 1$(112-1$^{\beta 1}$) of antenna unit 112-1 | Phase of feeding signal $\delta 1$(112-1$^{\delta 1}$) of antenna unit 112-1 | Phase of feeding signal$\beta 1$(112-2$^{\beta 1}$) of antenna unit 112-2 | Phase of feeding signal $\delta 1$(112-2$^{\delta 1}$) of antenna unit 112-2 |
| Value definition | 0 to $2\pi \pm 2n\pi$ | 0 to $2\pi \pm 2n\pi$ | 0 to $2\pi \pm 2n\pi$ | 0 to $2\pi \pm 2n\pi$ |
| Excitation | Amplitude of feeding signal$\beta 1$(112-1$^{\beta 1}$) of antenna unit 112-1 | Amplitude of feeding signal $\delta 1$(112-1$^{\delta 1}$) of antenna unit 112-1 | Amplitude of feeding signal$\beta 1$(112-2$^{\beta 1}$) of antenna unit 112-2 | Amplitude of feeding signal $\delta 1$(112-2$^{\delta 1}$) of antenna unit 112-2 |
| Value definition | Real number | Real number | Real number | Real number |

Figure 10:
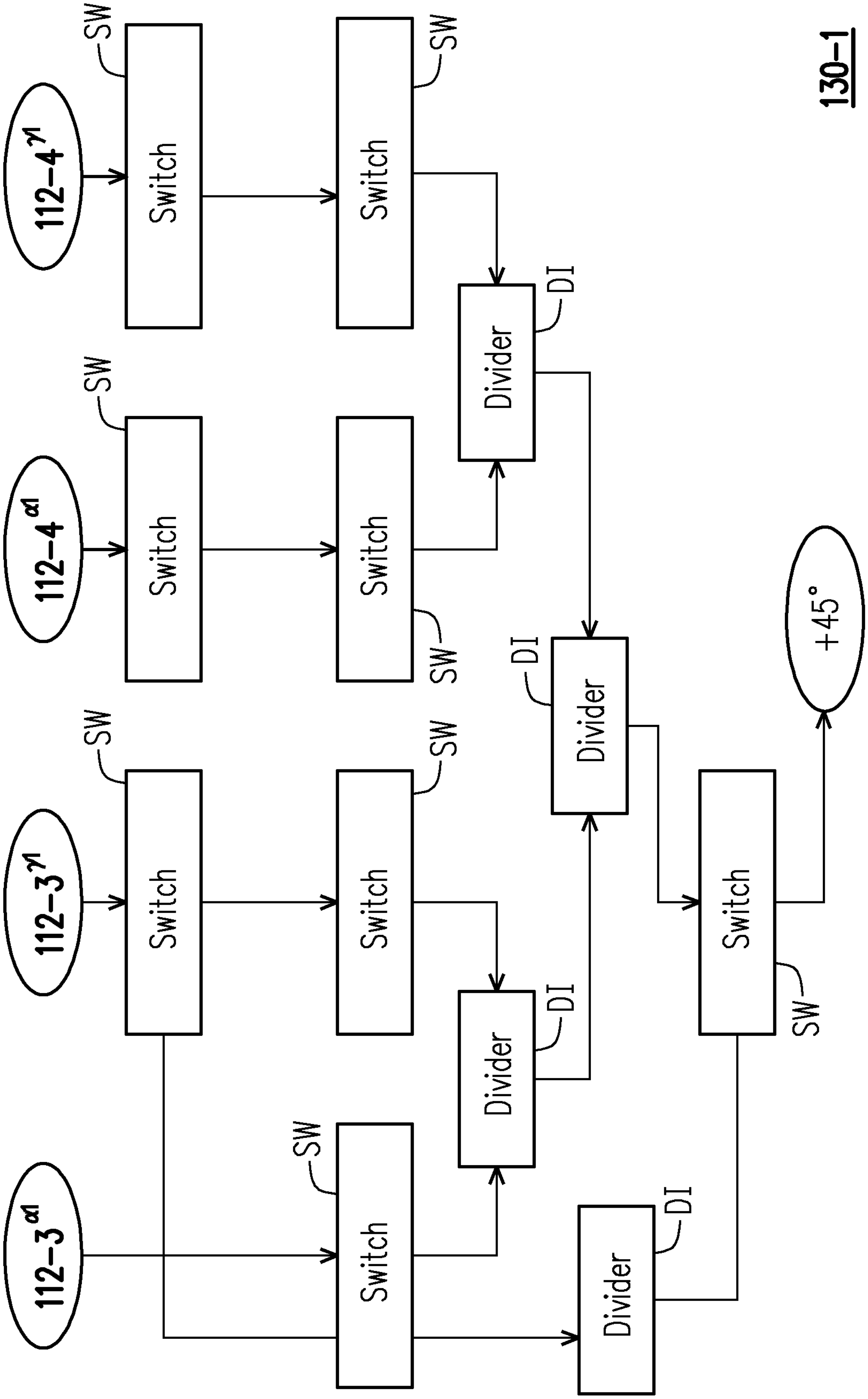
FIG. 10 is a block diagram of elements of an adjustment circuit for a +45-degree polarized direction according to an embodiment of the disclosure.

FIG. 10 is a block diagram of elements of an adjustment circuit 130-1 for a +45-degree polarized direction according to an embodiment of the disclosure. Referring to FIG. 10, the antenna structure 111-5 shown in FIG. 5 is taken as an example in the present embodiment. The adjustment circuit 130-1 includes switches SW and dividers DI, the switches SW may implement switching to different phases or different signals, and the dividers DI may combine two or more signals. Configurations of the switches SW and the dividers DI are designed with reference to the corresponding relationships in Table (1), thereby forming the feeding ports in the +45-degree polarized direction.

Figure 11B:
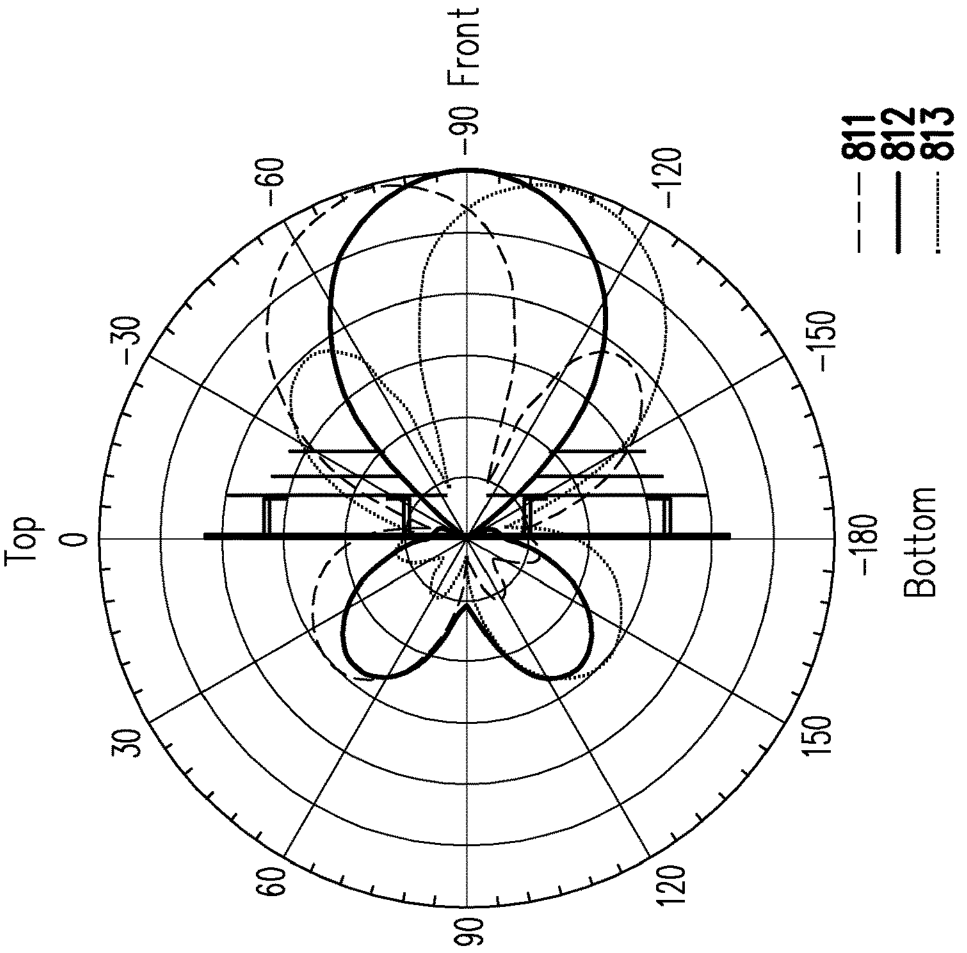
FIG. 11A and FIG. 11B are schematic diagrams of controlling beam shapes in the elevation for a +45-degree polarized direction according to the fifth embodiment of the disclosure.
Figure 11A:
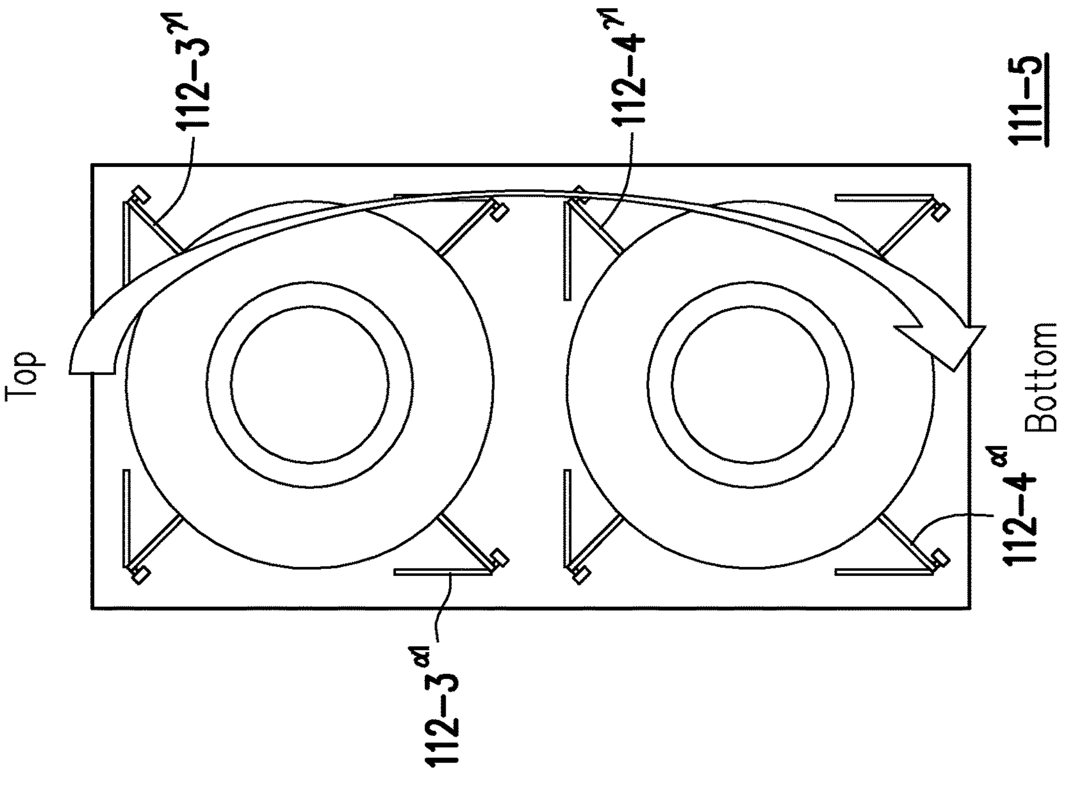

FIG. 11A and FIG. 11B are schematic diagrams of controlling beam shapes in the elevation direction for a +45-degree polarized direction according to the fifth embodiment of the disclosure. Referring to FIG. 11A and FIG. 11B, beams 811, 812 and 813 are in patterns formed for the directions toward the top, the front and the bottom respectively. Compared with the beam 812, the beam 811 is toward the top more; and compared with the beam 812, the beam 813 is toward the bottom more.

Figure 11D:
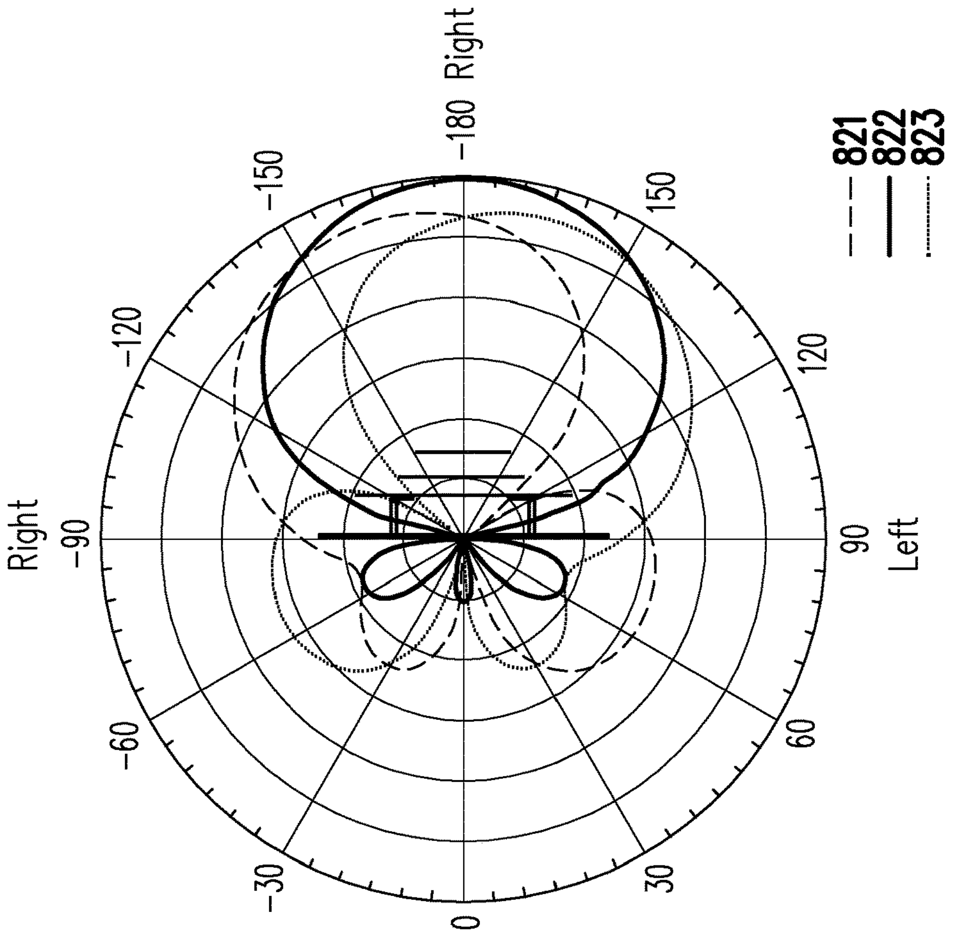
FIG. 11C and FIG. 11D are schematic diagrams of controlling beam shapes in the azimuth for a +45-degree polarized direction according to the fifth embodiment of the disclosure.
Figure 11C:
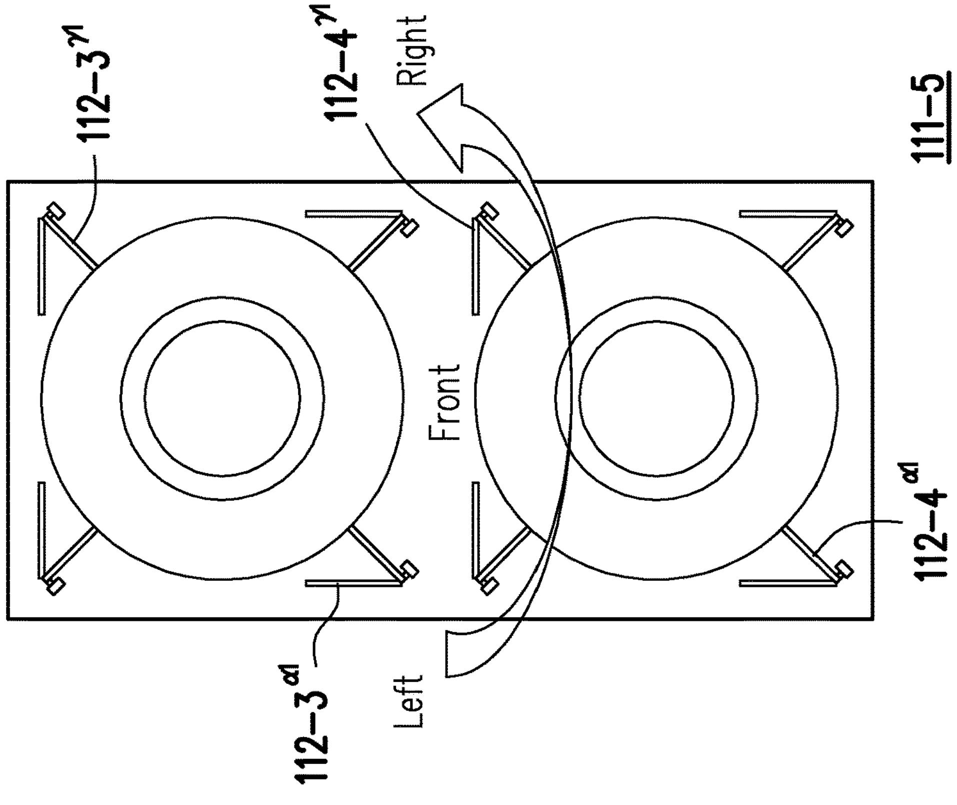
Figure 12A:
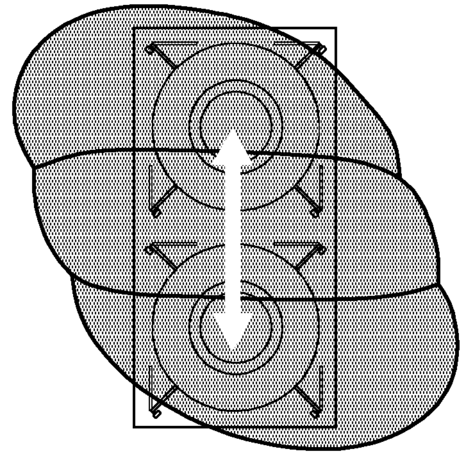
FIG. 12A to FIG. 12D are schematic diagrams of controlling beams in different directions for a +45-degree polarized direction according to the fifth embodiment of the disclosure.
Figure 12B:
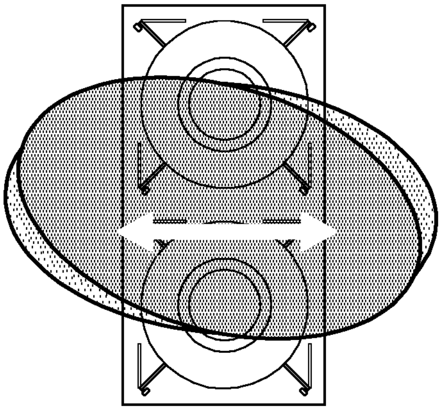
Figure 12C:
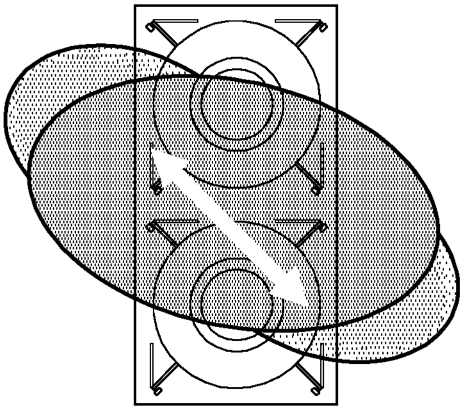
Figure 12D:
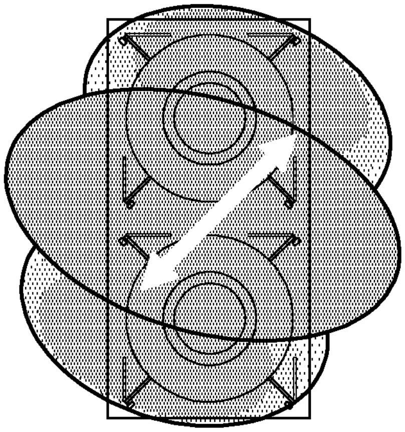

FIG. 11C and FIG. 11D are schematic diagrams of controlling beam shapes in the azimuth for a +45-degree polarized direction according to the fifth embodiment of the disclosure. Referring to FIG. 11C and FIG. 11D, beams 821, 822 and 823 are in patterns formed for the directions toward the right, the front and the left respectively. Compared with the beam 822, the beam 821 is toward the right more; and compared with the beam 822, the beam 823 is toward the left more.

FIG. 12A to FIG. 12D are schematic diagrams of controlling beams in the different directions for a +45-degree polarized direction according to the fourth embodiment of the disclosure. Referring to FIGS. 12A to 12D, the gains of the beams in different directions may also be improved by adjusting respective amplitudes, besides changing the phases of the feeding ports f1 to fi.

Figure 13:
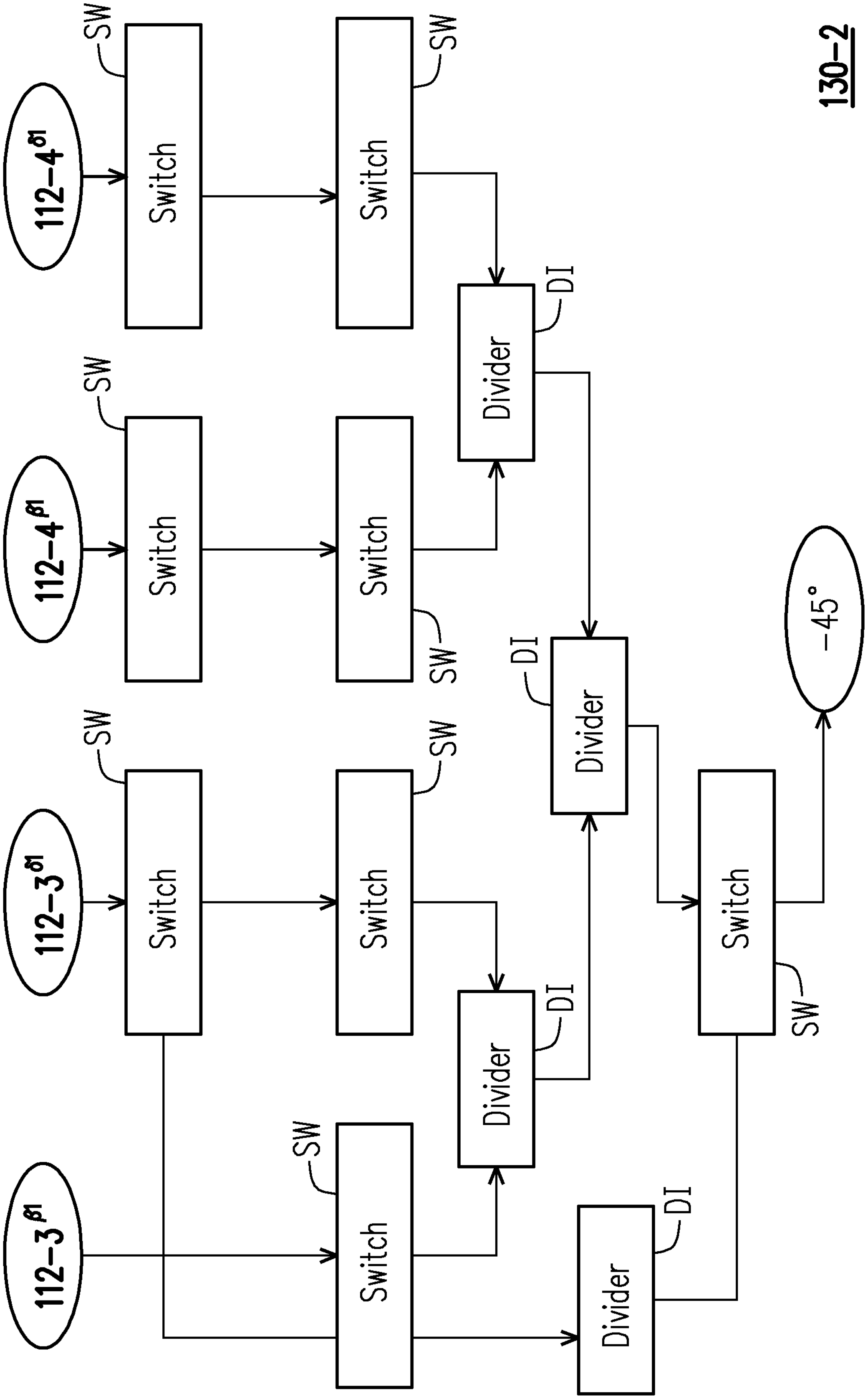
FIG. 13 is a block diagram of elements of an adjustment circuit for a −45-degree polarized direction according to an embodiment of the disclosure.

FIG. 13 is a block diagram of elements of an adjustment circuit 130-2 for a −45-degree polarized direction according to an embodiment of the disclosure. Referring to FIG. 13, the antenna structure 111-5 shown in FIG. 5 is taken as an example in the present embodiment. The difference from the embodiment shown in FIG. 10 is that the switches SW and the dividers DI are configured to form the feeding ports in the −45-degree polarized direction.

Figure 14B:
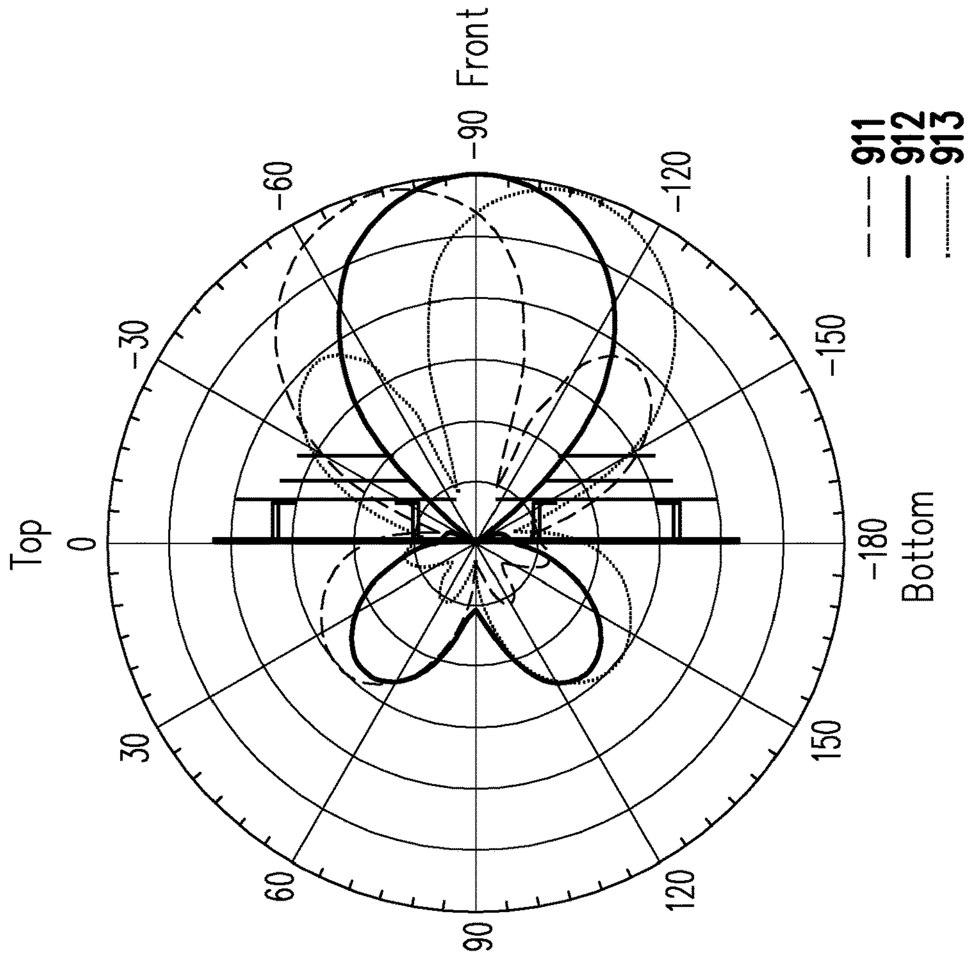
FIG. 14A and FIG. 14B are schematic diagrams of controlling beam shapes in the elevation for a −45-degree polarized direction according to the fifth embodiment of the disclosure.
Figure 14A:
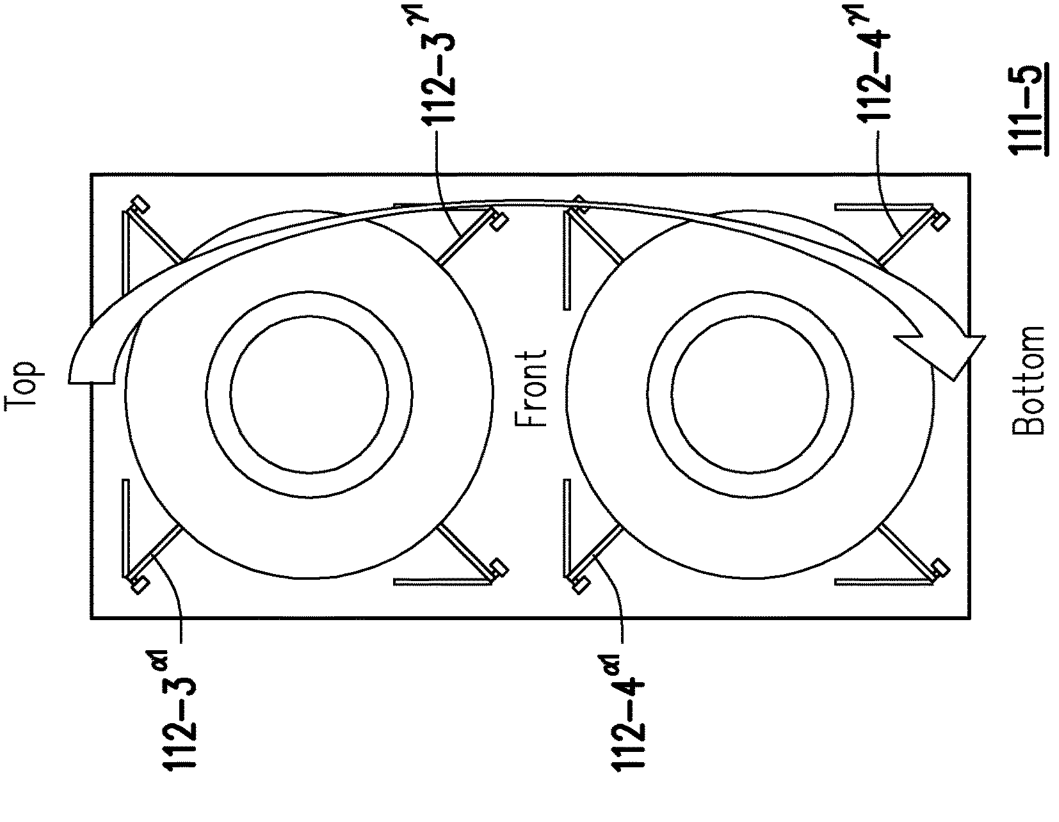

FIG. 14A and FIG. 14B are schematic diagrams of controlling beam shapes in the elevation for a −45-degree polarized direction according to the fifth embodiment of the disclosure. Referring to FIG. 14A and FIG. 14B, beams 911, 912 and 913 are in patterns formed for the directions toward the top, the front and the bottom respectively. Compared with the beam 912, the beam 911 is toward the top more; and compared with the beam 912, the beam 913 is toward the bottom more.

Figure 14D:
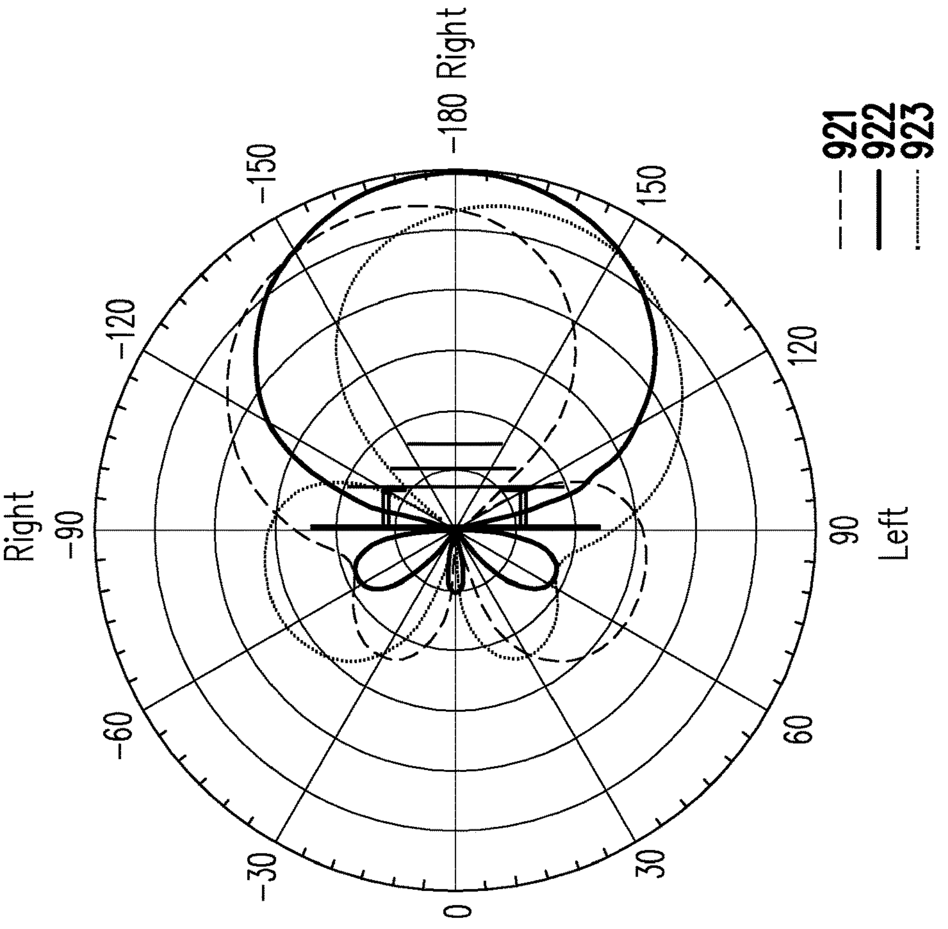
FIG. 14C and FIG. 14D are schematic diagrams of controlling beam shapes in the azimuth for a −45-degree polarized direction according to the fifth embodiment of the disclosure.
Figure 14C:
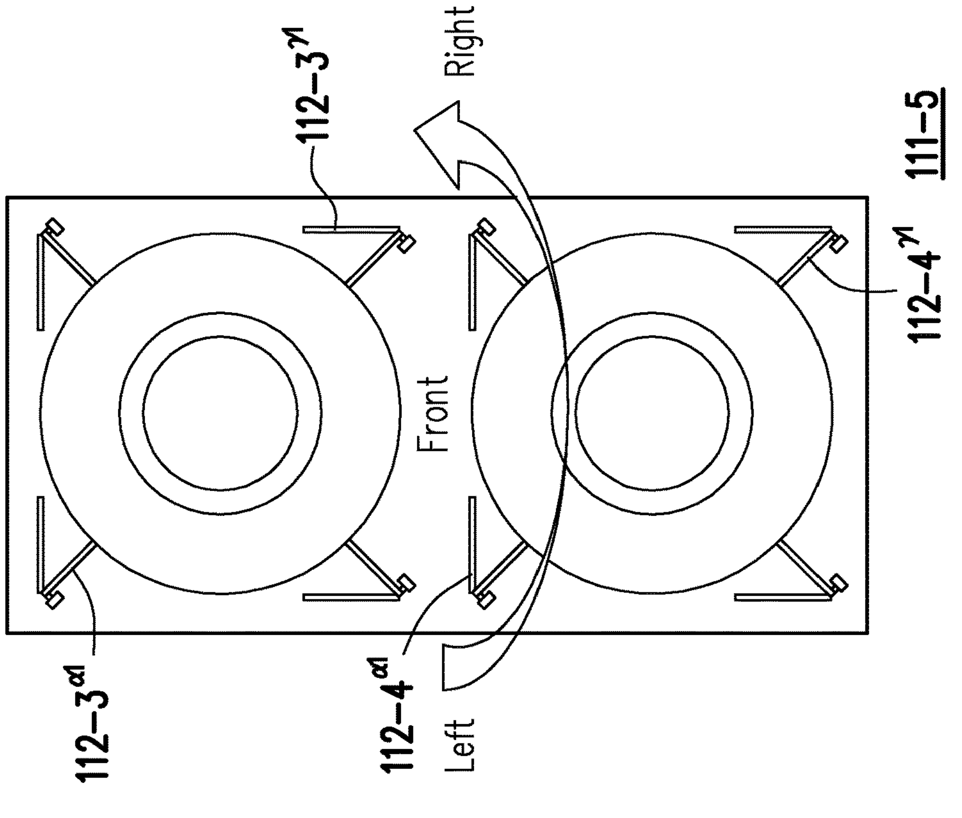
Figure 15A:
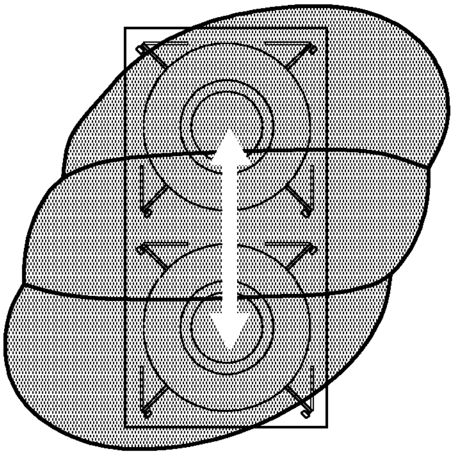
FIG. 15A to FIG. 15D are schematic diagrams of controlling beams in different directions for a −45-degree polarized direction according to the fifth embodiment of the disclosure.
Figure 15B:
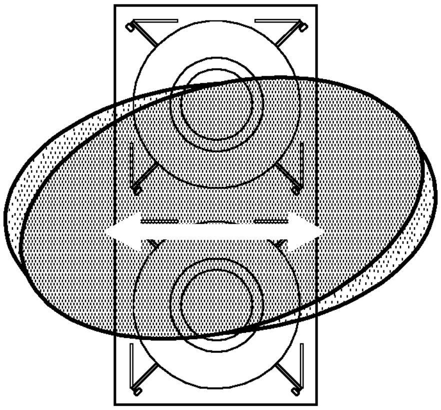
Figure 15C:
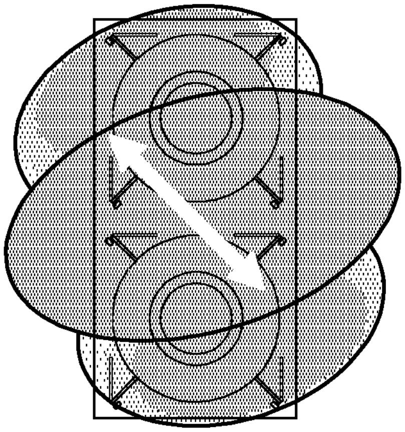
Figure 15D:
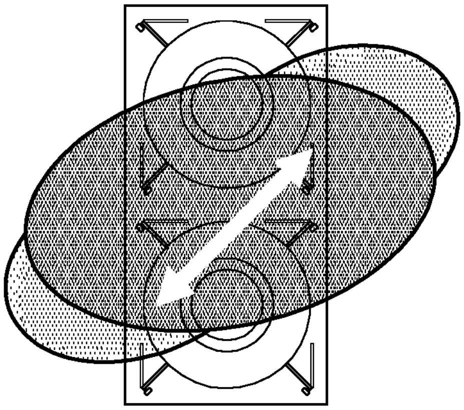

FIG. 14C and FIG. 14D are schematic diagrams of controlling beam shapes in the azimuth for a −45-degree polarized direction according to the fifth embodiment of the disclosure. Referring to FIG. 14C and FIG. 14D, beams 921, 922 and 923 are in patterns formed for the directions toward the right, the front and the left respectively. Compared with the beam 922, the beam 921 is toward the right more; and compared with the beam 922, the beam 923 is toward the left more.

FIG. 15A to FIG. 15D are schematic diagrams of controlling beams in different directions for a −45-degree polarized direction according to the fifth embodiment of the disclosure. Referring to FIGS. 15A to 15D, the gains of the beams in different directions may also be improved by adjusting the respective amplitudes, besides changing the phases of the feeding ports f1 to fi.

It can be seen that, according to the embodiment of the disclosure, an antenna array design with 1×1 or 2×1 antenna units 112 may be combined with such a setting that the feeding ports are controlled independently to implement steering of the beams in the elevation and the azimuth. Compared with the prior art where a design with at least 2×2 antenna elements is adopted, the embodiment of the disclosure has the advantage that the size of the antenna array may be reduced obviously.

It is to be noted that phase configurations of the feeding ports f1 to fi are not limited to the settings in Table (1) and Table (2) and there may be other changes in other embodiments. The adjustment circuits 130-1 and 130-2 implementing Table (1) and Table (2) are not limited to circuit architectures shown in FIGS. 10 and 13. In addition, waveform patterns and orientations shown in FIGS. 8B, 8D, 9B, 9D, 9F, 9H, 11B, 11D, 12A to 12D, 14B, 14D and 15A to 15D are only for exemplary description. On the other hand, settings are made only for the vectors of the feeding ports in a single polarized direction in the aforementioned embodiments, for example, only for the feeding ports f1 and f3 in the +45-degree polarized direction. In other embodiments, settings may also be made for the feeding ports in two or more polarized directions, for example, for the feeding ports f1 to f4 in the +45-degree and −45-degree polarized directions.

By parity of reasoning, the antenna structures 111-4 and 111-6 shown in FIG. 4 and FIG. 6 are taken as examples for steering adjustment of the M×N antenna units 112. The controller 150 may adjust the vectors of different feeding ports f1 to f4 of the M×N antenna units 112-1 and 112-3 according to the preset corresponding relationships, thereby controlling the beams to face different designated directions in the elevation and the azimuth.

Table (5) and Table (6) present corresponding relationships for the antenna structure 111-6 of the sixth embodiment (the feeding ports f1 and f3 are controlled for Table (5) and the feeding ports f2 and f4 are controlled for Table (6)).

TABLE (5)

| | | | | |
|---|---|---|---|---|
| Excitation | Phase of feeding signal $\alpha 1(112\text{-}3^{\alpha 1})$ of $(1, 1)^{th}$ antenna unit 112-3 | Phase of feeding signal $\alpha 1(112\text{-}3^{\alpha 1})$ of $(1, 2)^{th}$ antenna unit 112-3 | . . . | Phase of feeding signal $\alpha 1(112\text{-}3^{\alpha 1})$ of $(1, N)^{th}$ antenna unit 112-3 |
| Value definition | 0 to 2π ± 2nπ | 0 to 2π ± 2nπ | . . . | 0 to 2π ± 2nπ |
| | Phase of feeding signal $\alpha 1(112\text{-}3^{\alpha 1})$ of $(2, 1)^{th}$ antenna unit 112-3 | Phase of feeding signal $\alpha 1(112\text{-}3^{\alpha 1})$ of $(2, 2)^{th}$ antenna unit 112-3 | . . . | Phase of feeding signal $\alpha 1(112\text{-}3^{\alpha 1})$ of $(2, N)^{th}$ antenna unit 112-3 |
| Value definition | 0 to 2π ± 2nπ | 0 to 2π ± 2nπ | . . . | 0 to 2π ± 2nπ |
| . . . | . . . | . . . | . . . | . . . |
| Excitation | Phase of feeding signal $\alpha 1(112\text{-}3^{\alpha 1})$ of $(M, 1)^{th}$ antenna unit 112-3 | Phase of feeding signal $\alpha 1(112\text{-}3^{\alpha 1})$ of $(M, 2)^{th}$ antenna unit 112-3 | . . . | Phase of feeding signal $\alpha 1(112\text{-}3^{\alpha 1})$ of $(M, N)^{th}$ antenna unit 112-3 |
| Value definition | 0 to 2π ± 2nπ | 0 to 2π ± 2nπ | . . . | 0 to 2π ± 2nπ |
| Excitation | Phase of feeding signal $\gamma 1(112\text{-}3^{\gamma 1})$ of $(1, 1)^{th}$ antenna unit 112-3 | Phase of feeding signal $\gamma 1(112\text{-}3^{\gamma 1})$ of $(1, 2)^{th}$ antenna unit 112-3 | . . . | Phase of feeding signal $\gamma 1(112\text{-}3^{\gamma 1})$ of $(1, N)^{th}$ antenna unit 112-3 |
| Value definition | 0 to 2π ± 2nπ | 0 to 2π ± 2nπ | . . . | 0 to 2π ± 2nπ |
| | Phase of feeding signal $\gamma 1(112\text{-}3^{\gamma 1})$ of $(2, 1)^{th}$ antenna unit 112-3 | Phase of feeding signal $\gamma 1(112\text{-}3^{\gamma 1})$ of $(2, 2)^{th}$ antenna unit 112-3 | . . . | Phase of feeding signal $\gamma 1(112\text{-}3^{\gamma 1})$ of $(2, N)^{th}$ antenna unit 112-3 |
| Value definition | 0 to 2π ± 2nπ | 0 to 2π ± 2nπ | . . . | 0 to 2π ± 2nπ |
| . . . | . . . | . . . | . . . | . . . |
| Excitation | Phase of feeding signal $\gamma 1(112\text{-}3^{\gamma 1})$ of $(M, 1)^{th}$ antenna unit 112-3 | Phase of feeding signal $\gamma 1(112\text{-}3^{\gamma 1})$ of $(M, 2)^{th}$ antenna unit 112-3 | . . . | Phase of feeding signal $\gamma 1(112\text{-}3^{\gamma 1})$ of $(M, N)^{th}$ antenna unit 112-3 |

TABLE (5)-continued

| | | | | |
|---|---|---|---|---|
| Value definition | 0 to 2π ± 2nπ | 0 to 2π ± 2nπ | . . . | 0 to 2π ± 2nπ |
| Excitation | Amplitude of feeding signal α1(112-$3^{\alpha1}$) of (1, 1)$^{th}$ antenna unit 112-3 | Amplitude of feeding signal α1(112-$3^{\alpha1}$) of (1, 2)$^{th}$ antenna unit 112-3 | . . . | Amplitude of feeding signal α1(112-$3^{\alpha1}$) of (1, N)$^{th}$ antenna unit 112-3 |
| Value definition | Real number | Real number | . . . | Real number |
| | Amplitude of feeding signal α1(112-$3^{\alpha1}$) of (2, 1)$^{th}$ antenna unit 112-3 | Amplitude of feeding signal α1(112-$3^{\alpha1}$) of (2, 2)$^{th}$ antenna unit 112-3 | . . . | Amplitude of feeding signal α1(112-$3^{\alpha1}$) of (2, N)$^{th}$ antenna unit 112-3 |
| Value definition | Real number | Real number | . . . | Real number |
| . . . | . . . | . . . | . . . | . . . |
| | Amplitude of feeding signal α1(112-$3^{\alpha1}$) of (M, 1)$^{th}$ antenna unit 112-3 | Amplitude of feeding signal α1(112-$3^{\alpha1}$) of (M, 2)$^{th}$ antenna unit 112-3 | . . . | Amplitude of feeding signal α1(112-$3^{\alpha1}$) of (M, N)$^{th}$ antenna unit 112-3 |
| Value definition | Real number | Real number | . . . | Real number |
| | Amplitude of feeding signal γ1(112-$3^{\gamma1}$) of (1, 1)$^{th}$ antenna unit 112-3 | Amplitude of feeding signal γ1(112-$3^{\gamma1}$) of (1, 2)$^{th}$ antenna unit 112-3 | . . . | Amplitude of feeding signal γ1(112-$3^{\gamma1}$) of (1, N)$^{th}$ antenna unit 112-3 |
| Value definition | Real number | Real number | . . . | Real number |
| | Amplitude of feeding signal γ1(112-$3^{\gamma1}$) of (2, 1)$^{th}$ antenna unit 112-3 | Amplitude of feeding signal γ1(112-$3^{\gamma1}$) of (2, 2)$^{th}$ antenna unit 112-3 | . . . | Amplitude of feeding signal γ1(112-$3^{\gamma1}$) of (2, N)$^{th}$ antenna unit 112-3 |
| Value definition | Real number | Real number | . . . | Real number |
| . . . | . . . | . . . | . . . | . . . |
| | Amplitude of feeding signal γ1(112-$3^{\gamma1}$) of (M, 1)$^{th}$ antenna unit 112-3 | Amplitude of feeding signal γ1(112-$3^{\gamma1}$) of (M, 2)$^{th}$ antenna unit 112-3 | . . . | Amplitude of feeding signal γ1(112-$3^{\gamma1}$) of (M, N)$^{th}$ antenna unit 112-3 |
| Value definition | Real number | Real number | . . . | Real number |

TABLE 6

| | | | | |
|---|---|---|---|---|
| Excitation | Phase of feeding signalβ1 (112-$3^{\beta1}$) of (1,1)$^{th}$ antenna unit 112-3 | Phase of feeding signalβ1 (112-$3^{\beta1}$) of (1,2)$^{th}$ antenna unit 112-3 | . . . | Phase of feeding signalβ1 (112-$3^{\beta1}$) of (1,N)$^{th}$ antenna unit 112-3 |
| Value definition | 0 to 2π ± 2nπ | 0 to 2π ± 2nπ | . . . | 0 to 2π ± 2nπ |
| | Phase of feeding signalβ1 (112-$3^{\beta1}$) of (2,1)$^{th}$ antenna unit 112-3 | Phase of feeding signalβ1 (112-$3^{\beta1}$) of (2,2)$^{th}$ antenna unit 112-3 | . . . | Phase of feeding signalβ1 (112-$3^{\beta1}$) of (2,N)$^{th}$ antenna unit 112-3 |
| Value definition | 0 to 2π ± 2nπ | 0 to 2π ± 2nπ | . . . | 0 to 2π ± 2nπ |
| . . . | . . . | . . . | . . . | . . . |
| Excitation | Phase of feeding signalβ1 (112-$3^{\beta1}$) of (M,1)$^{th}$ antenna unit 112-3 | Phase of feeding signalβ1 (112-$3^{\beta1}$) of (M,2)$^{th}$ antenna unit 112-3 | . . . | Phase of feeding signalβ1 (112-$3^{\beta1}$) of (M,N)$^{th}$ antenna unit 112-3 |
| Value definition | 0 to 2π ± 2nπ | 0 to 2π ± 2nπ | . . . | 0 to 2π ± 2nπ |
| Excitation | Phase of feeding signalδ1 (112-$3^{\delta1}$) of (1,1)$^{th}$ antenna unit 112-3 | Phase of feeding signalδ1 (112-$3^{\delta1}$) of (1,2)$^{th}$ antenna unit 112-3 | . . . | Phase of feeding signalδ1 (112-$3^{\delta1}$) of (1,N)$^{th}$ antenna unit 112-3 |

TABLE 6-continued

| | | | | |
|---|---|---|---|---|
| Value definition | 0 to 2π ± 2nπ | 0 to 2π ± 2nπ | . . . | 0 to 2π ± 2nπ |
| | Phase of feeding signalδ1 (112-$3^{\delta1}$) of (2,1)$^{th}$ antenna unit 112-3 | Phase of feeding signalδ 1 (112-$3^{\delta1}$) of (2,2)$^{th}$ antenna unit 112-3 | . . . | Phase of feeding signalδ1 (112-$3^{\delta1}$) of (2,N)$^{th}$ antenna unit 112-3 |
| Value definition | 0 to 2π ± 2nπ | 0 to 2π ± 2nπ | . . . | 0 to 2π ± 2nπ |
| . . . | . . . | . . . | . . . | . . . |
| Excitation | Phase of feeding signalδ1 (112-$3^{\delta1}$) of (M,1)$^{th}$ antenna unit 112-3 | Phase of feeding signalδ1 (112-$3^{\delta1}$) of (M,2)$^{th}$ antenna unit 112-3 | . . . | Phase of feeding signalδ1 (112-$3^{\delta1}$) of (M,N)$^{th}$ antenna unit 112-3 |
| Value definition | 0 to 2π ± 2nπ | 0 to 2π ± 2nπ | . . . | 0 to 2π ± 2nπ |
| Excitation | Amplitude of feeding signalβ1 (112-$3^{\beta1}$) of (1,1)$^{th}$ antenna unit 112-3 | Amplitude of feeding signalβ1 (112-$3^{\beta1}$) of (1,2)$^{th}$ antenna unit 112-3 | . . . | Amplitude of feeding signalβ1 (112-$3^{\beta1}$) of (1,N)$^{th}$ antenna unit 112-3 |
| Value definition | Real number | Real Number | . . . | Real Number |
| | Amplitude of feeding signalβ1 (112-$3^{\beta1}$) of (2,1)$^{th}$ | Amplitude of feeding signalβ1 (112-$3^{\beta1}$) of (2,2)$^{th}$ | . . . | Amplitude of feeding signalβ1 (112-$3^{\beta1}$) of (2,N)$^{th}$ |

TABLE 6-continued

| | | | | |
|---|---|---|---|---|
| | antenna unit 112-3 | antenna unit 112-3 | | antenna unit 112-3 |
| Value definition | Real number | Real Number | . . . | Real Number |
| . . . | . . . | . . . | . . . | . . . |
| | Amplitude of feeding signalβ1 (112-$3^{\beta 1}$) of $(M,1)^{th}$ antenna unit 112-3 | Amplitude of feeding signalβ1 (112-$3^{\beta 1}$) of $(M,2)^{th}$ antenna unit 112-3 | . . . | Amplitude of feeding signalβ1 (112-$3^{\beta 1}$) of $(M,N)^{th}$ antenna unit 112-3 |
| Value definition | Real number | Real Number | . . . | Real Number |
| Excitation | Amplitude of feeding signalδ1 (112-$3^{\delta 1}$) of $(1,1)^{th}$ antenna unit 112-3 | Amplitude of feeding signalδ1 (112-$3^{\delta 1}$) of $(1,2)^{th}$ antenna unit 112-3 | . . . | Amplitude of feeding signalδ1 (112-$3^{\delta 1}$) of $(1,N)^{th}$ antenna unit 112-3 |
| Value definition | Real number | Real Number | . . . | Real Number |
| Excitation | Amplitude of feeding signalδ1 (112-$3^{\delta 1}$) of $(2,1)^{th}$ antenna unit 112-3 | Amplitude of feeding signalδ1 (112-$3^{\delta 1}$) of $(2,2)^{th}$ antenna unit 112-3 | . . . | Amplitude of feeding signalδ1 (112-$3^{\delta 1}$) of $(2,N)^{th}$ antenna unit 112-3 |
| Value definition | Real number | Real Number | . . . | Real Number |
| . . . | . . . | . . . | . . . | . . . |
| | Amplitude of feeding signalδ1 (112-$3^{\delta 1}$) of $(M,1)^{th}$ antenna unit 112-3 | Amplitude of feeding signalδ1 (112-$3^{\delta 1}$) of $(M,2)^{th}$ antenna unit 112-3 | . . . | Amplitude of feeding signalδ1 (112-$3^{\delta 1}$) of $(M,N)^{th}$ antenna unit 112-3 |
| Value definition | Real number | Real Number | . . . | Real Number |

Based on the above, according to the antenna apparatus, the communication apparatus and the steering adjustment method thereof of the embodiments of the disclosure, an antenna array consisting of multi-polarized antenna units is provided, and the vector of each feeding port may be controlled separately. Accordingly, not only may the antenna efficiency (for example, isolation, correlation coefficient or gain) be maintained and even improved, but also the directions of the formed beams in different directions in the elevation and the azimuth may be achieved. Compared with the prior art, the antenna size may be reduced for application to miniature devices.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. An antenna apparatus, comprising:

an antenna structure, comprising:

M×N antenna units, where M is a positive integer larger than 1, and N is a positive integer larger than 0, each of the antenna units comprising:

i feeding ports, wherein a vector of each of the feeding ports is controlled independently, and i is a positive integer larger than 2, wherein independent control of the vector of each of the feeding ports comprising disabling adjustment of the vector of at least one of the feeding ports, wherein the feeding ports comprise:

at least one first-angle feeding port, a feeding signal of the at least one first-angle feeding port being configured to form a beam in a first polarized direction; and at least one second-angle feeding port, a feeding signal of the at least one second-angle feeding port being configured to form a beam in a second polarized direction, the second polarized direction being orthogonal to the first polarized direction, wherein there is no linear relationship between adjustment over vectors of the feeding ports, wherein a phase difference between the feeding ports is a variable value.

2. The antenna apparatus according to claim 1, wherein a feeding direction of the at least one first-angle feeding port of each of the antenna units corresponds to a feeding direction of the at least one first-angle feeding port of the other antenna units, and a feeding direction of the at least one second-angle feeding port of each of the antenna units corresponds to a feeding direction of the at least one second-angle feeding port of the other antenna units.

3. A communication apparatus, comprising:

the antenna apparatus according to claim 1; and a controller, electrically connected with the antenna apparatus, wherein the controller is configured to:

set vectors of the feeding ports according to a designated direction, the designated direction corresponding to beam directionality of the antenna structure.

4. The communication apparatus according to claim 3, wherein a feeding direction of the at least one first-angle feeding port of each of the antenna units corresponds to a feeding direction of the at least one first-angle feeding port of the other antenna units, and a feeding direction of the at least one second-angle feeding port of each of the antenna units corresponds to a feeding direction of the at least one second-angle feeding port of the other antenna units.

5. A steering adjustment method, adapted to an antenna structure, the steering adjustment method comprising:

providing the M×N antenna units according to claim 1 in the antenna structure;

determining a designated direction, the designated direction corresponding to beam directionality of the antenna structure; and setting vectors of the feeding ports of each of the antenna units according to the designated direction.

6. The steering adjustment method according to claim 5, wherein the step of setting the vectors of the feeding ports of each of the antenna units according to the designated direction comprises:

providing a corresponding relationship, the corresponding relationship comprising correspondence of at least one assumed direction to vector configurations of the feeding ports of each of the antenna units;

determining the vector configurations corresponding to the at least one assumed direction according to the designated direction; and setting the vectors of the feeding ports of each of the antenna units according to the determined vector configurations.

7. The steering adjustment method according to claim 5, wherein the step of setting the vectors of the feeding ports of each of the antenna units according to the designated direction comprises:

setting only the vector of the at least one first-angle feeding port of each of the antenna units according to the designated direction, adjustment over the vector of the at least one second-angle feeding port being disabled.

8. The steering adjustment method according to claim 7, wherein the step of setting the vectors of the feeding ports of each of the antenna units according to the designated direction comprises:

setting only the vector of at least one second-angle feeding port of each of the antenna units according to the designated direction, adjustment over a vector of at least one first-angle feeding port being disabled.

* * * * *